(12) United States Patent
Okada et al.

(10) Patent No.: US 7,251,076 B1
(45) Date of Patent: Jul. 31, 2007

(54) OPTICAL COMPONENT AND METHOD FOR PRODUCING THICK POLYIMIDE FILM

(75) Inventors: Kuniaki Okada, Nara (JP); Hiroyuki Yamamoto, Nara (JP); Shinya Yoshida, Nara (JP); Yukio Kurata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 455 days.

(21) Appl. No.: 10/111,906

(22) PCT Filed: Jul. 10, 2000

(86) PCT No.: PCT/JP00/04615

§ 371 (c)(1),
(2), (4) Date: Sep. 3, 2002

(87) PCT Pub. No.: WO01/31369

PCT Pub. Date: May 3, 2001

(30) Foreign Application Priority Data

Oct. 28, 1999 (JP) .................... 11/306498

(51) Int. Cl.
*G02B 5/30* (2006.01)

(52) U.S. Cl. .................... 359/495; 359/496

(58) Field of Classification Search ............ 359/495, 359/496, 500, 831, 837; 385/31, 37
See application file for complete search history.

(56) References Cited

U.S. PATENT DOCUMENTS

| | | | | |
|---|---|---|---|---|
| 3,610,729 A | * | 10/1971 | Rogers | 359/488 |
| 3,839,067 A | * | 10/1974 | Sosnowski et al. | 427/164 |
| 3,948,583 A | * | 4/1976 | Tien | 385/14 |
| 4,446,305 A | * | 5/1984 | Rogers et al. | 528/348 |
| 5,094,517 A | * | 3/1992 | Franke | 385/12 |
| 5,122,905 A | * | 6/1992 | Wheatley et al. | 359/586 |
| 5,122,906 A | * | 6/1992 | Wheatley | 359/586 |
| 5,208,800 A | * | 5/1993 | Isobe et al. | 369/112.27 |
| 5,262,894 A | * | 11/1993 | Wheatley et al. | 359/586 |
| 5,471,440 A | * | 11/1995 | Isobe | 369/13.29 |
| 5,486,949 A | * | 1/1996 | Schrenk et al. | 359/498 |
| 5,492,607 A | * | 2/1996 | Yap | 204/192.34 |
| 5,495,462 A | * | 2/1996 | Nishiwaki et al. | 369/112.27 |
| 5,652,816 A | * | 7/1997 | Minami et al. | 385/31 |
| 5,726,962 A | * | 3/1998 | Okada et al. | 369/44.23 |
| 5,781,676 A | * | 7/1998 | Okada | 385/31 |
| 6,124,905 A | * | 9/2000 | Iijima | 349/62 |
| 6,166,372 A | * | 12/2000 | Yamamoto et al. | 250/225 |
| 6,198,862 B1 | * | 3/2001 | Nakajima et al. | 385/33 |
| 6,324,313 B1 | * | 11/2001 | Allman et al. | 385/14 |

FOREIGN PATENT DOCUMENTS

| | | |
|---|---|---|
| JP | 6-020297 | 1/1994 |
| JP | 6-265738 | 9/1994 |
| JP | 8-134211 | 5/1996 |

* cited by examiner

*Primary Examiner*—Ricky D. Shafer
(74) *Attorney, Agent, or Firm*—Edwards Angell Palmer & Dodge LLP; David G. Conlin; Mark D. Russett

(57) ABSTRACT

An optical component according to the present invention comprises a substrate, and at least one optical element obtained by processing at least one thick optical film provided on the substrate. The optical component has a plurality of surfaces substantially not parallel to a surface of the substrate.

4 Claims, 16 Drawing Sheets

FIG.1
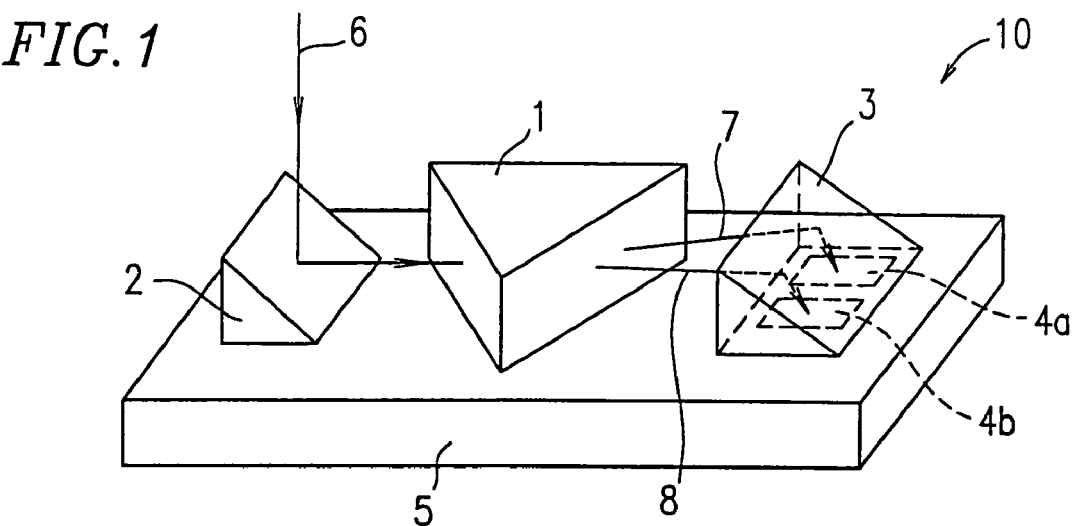
FIG.2
(a)
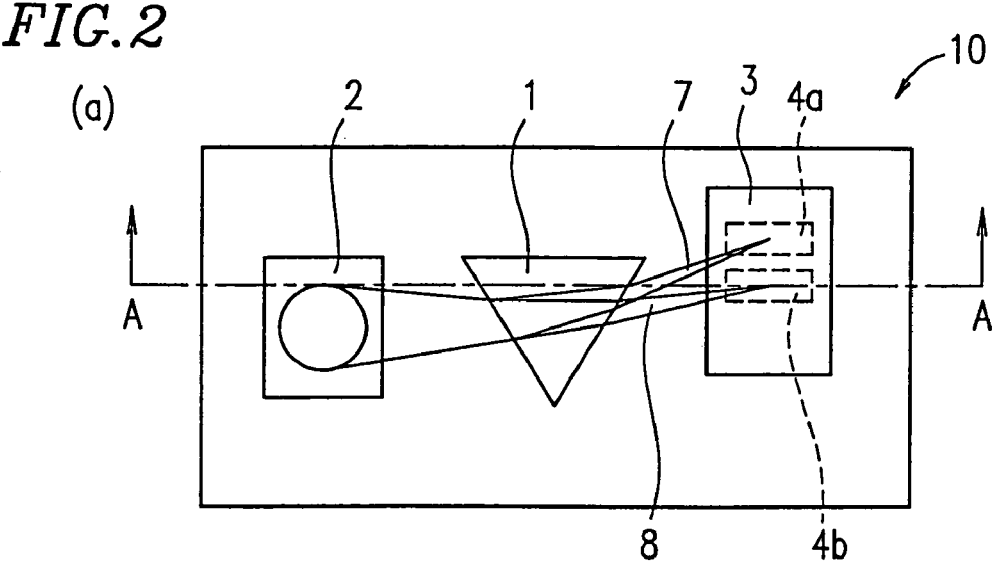
(b)
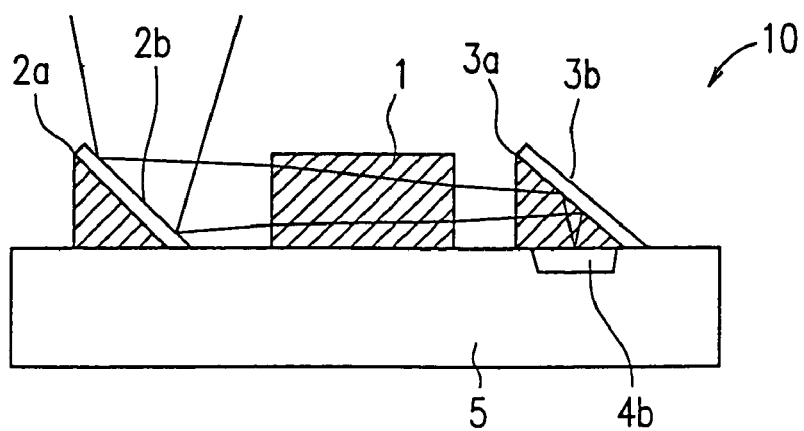

FIG.3
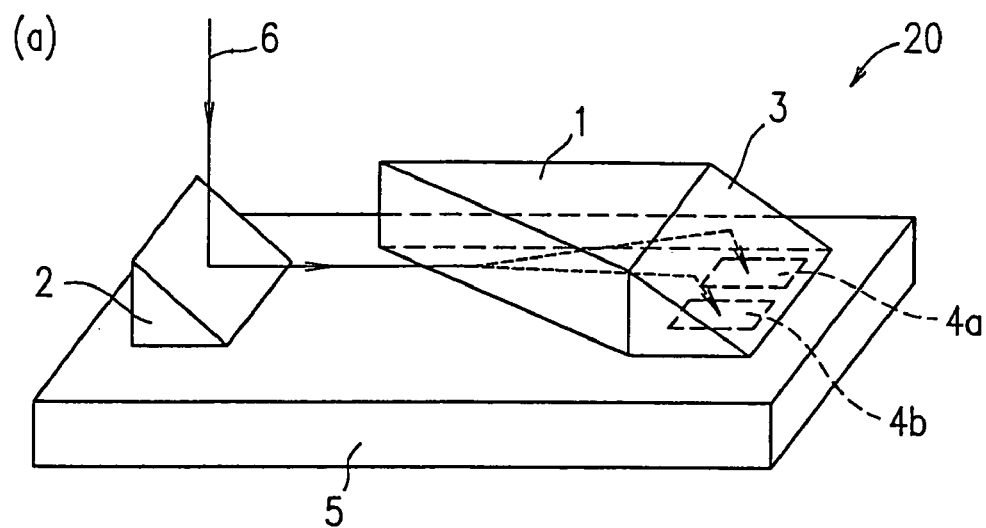
(a)
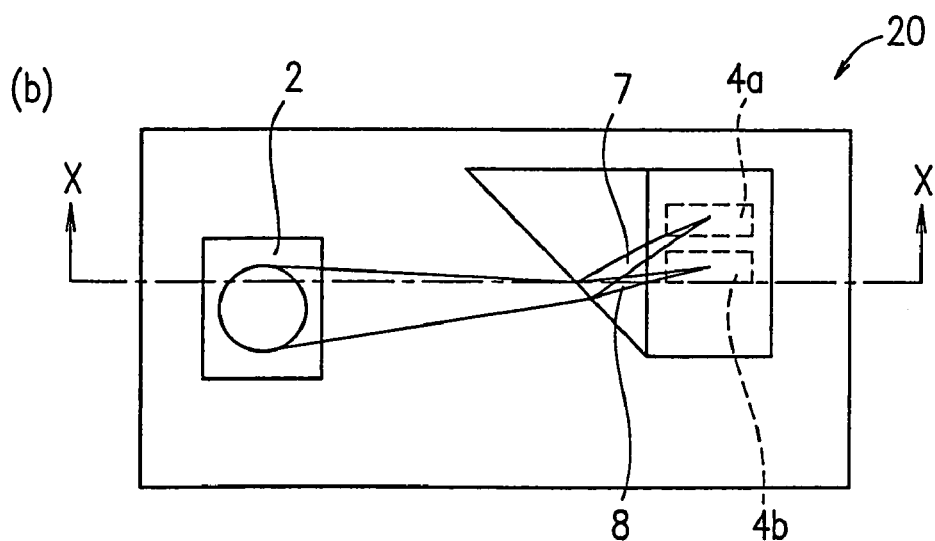
(b)
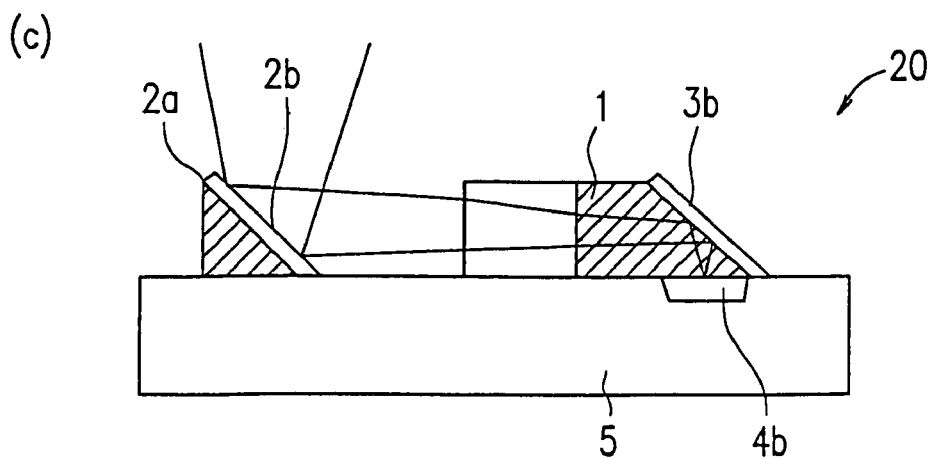
(c)

FIG. 4
(a)
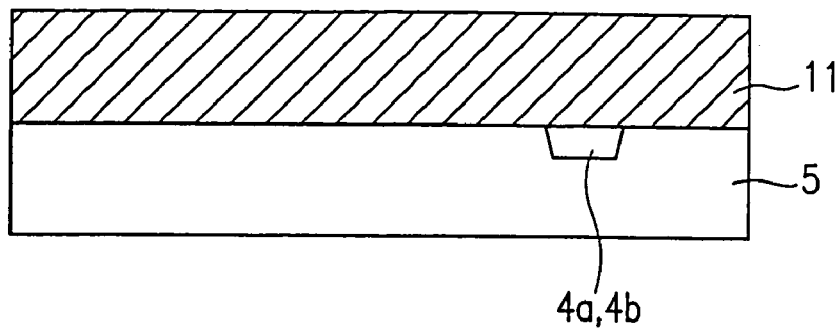
(b)
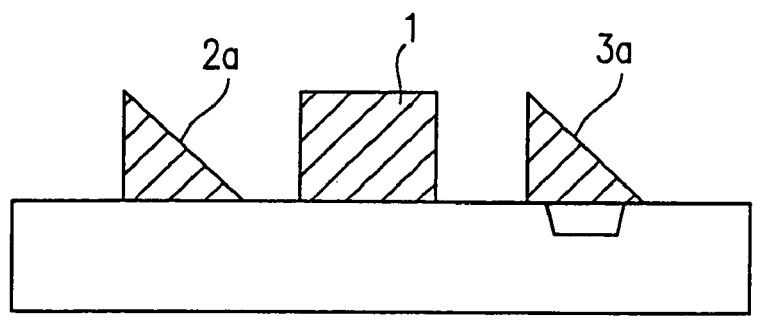
(c)
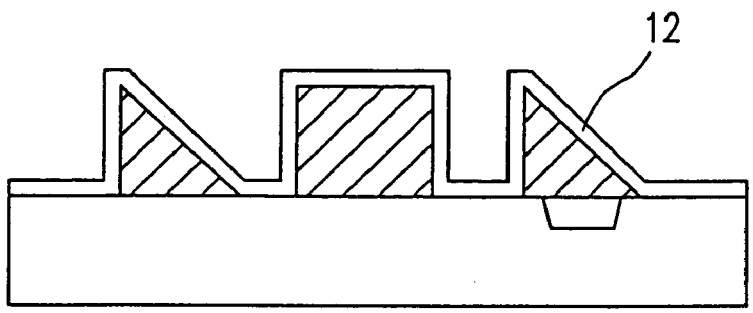
(d)
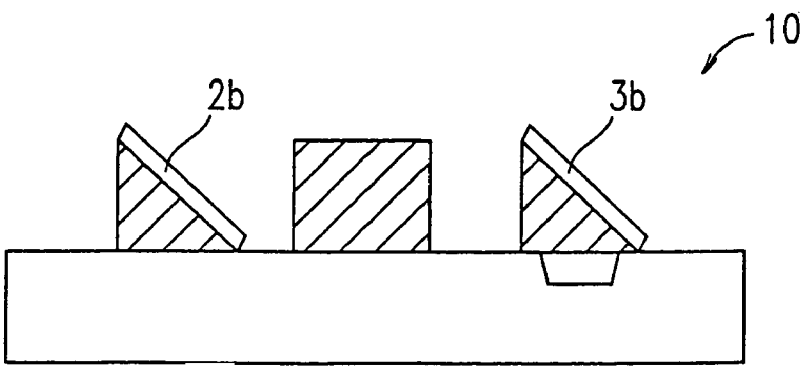

FIG.5
(a)
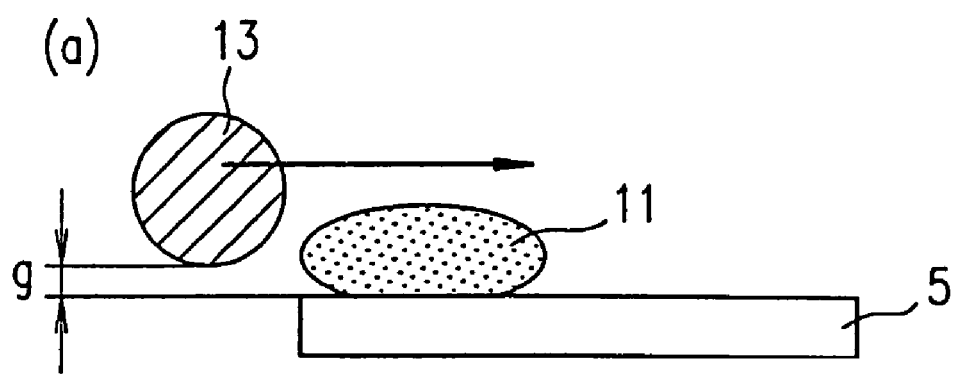
(b)
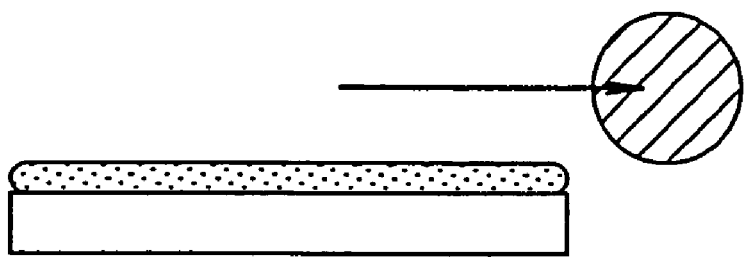

FIG.7
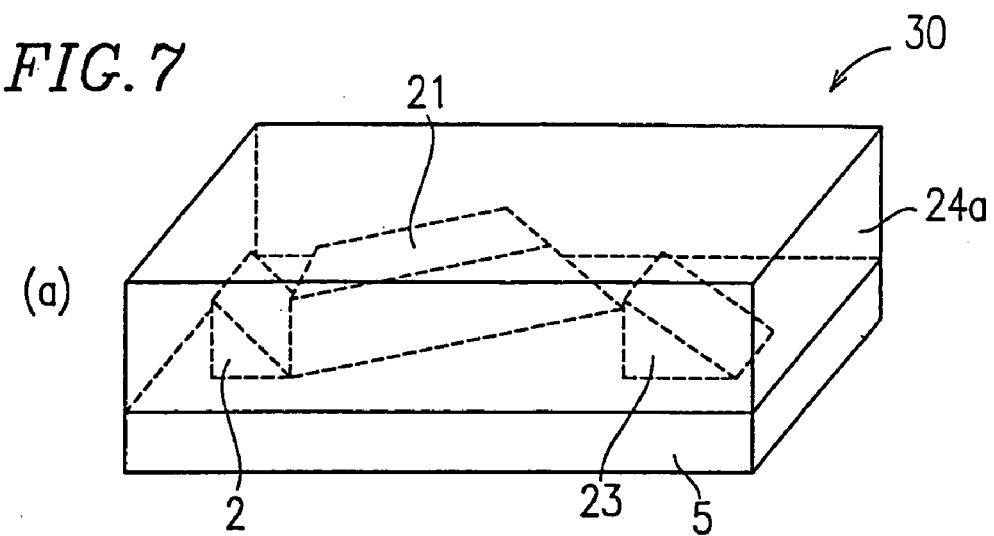
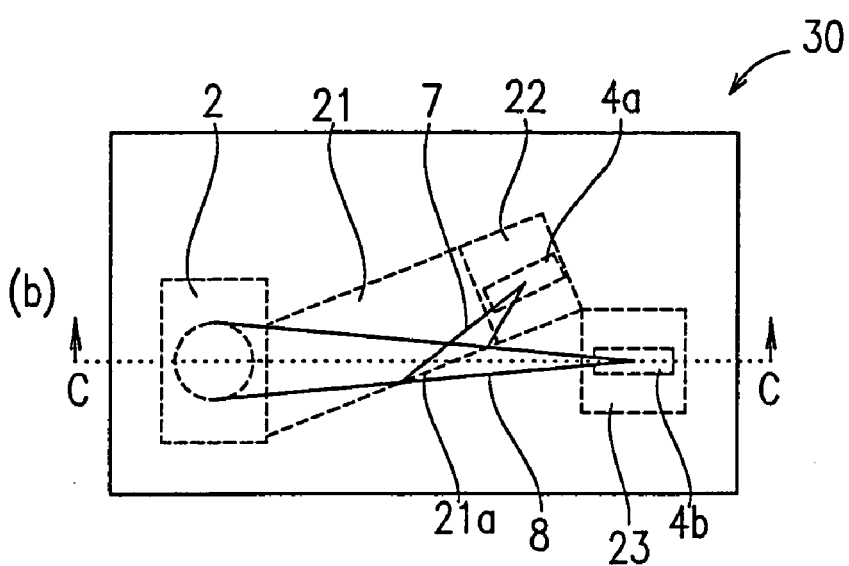
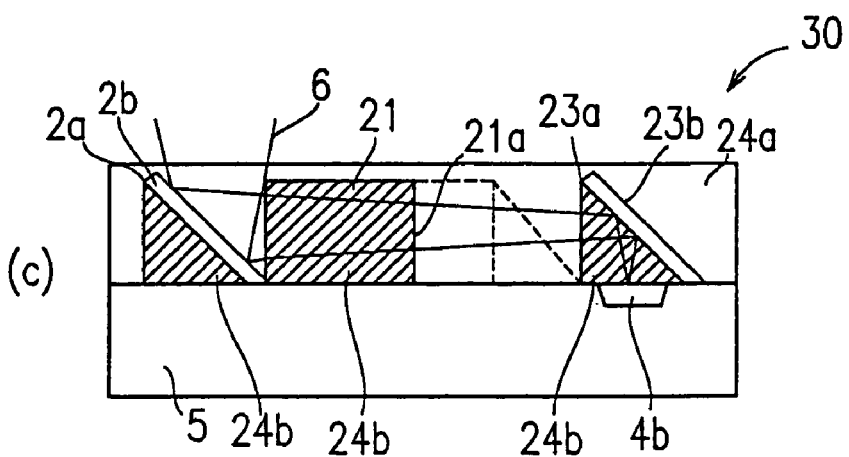

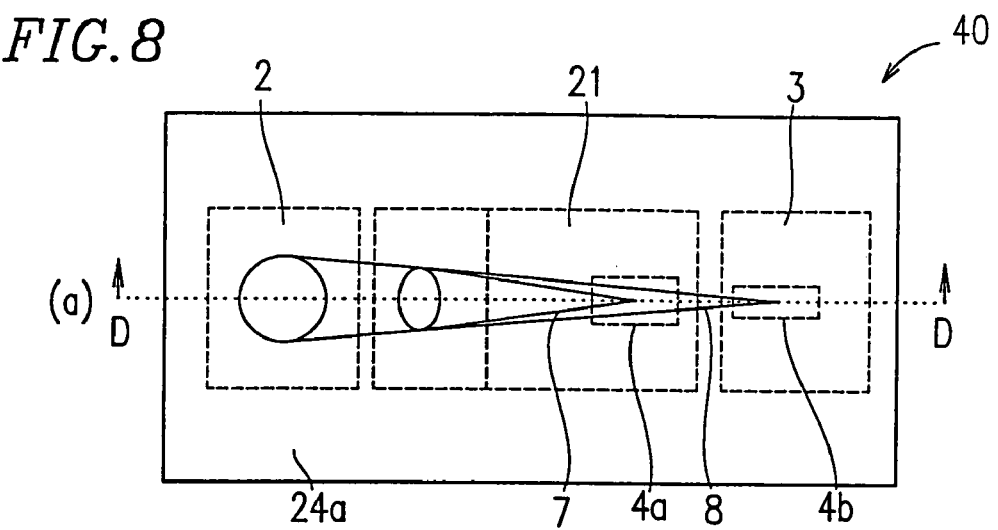
FIG. 8
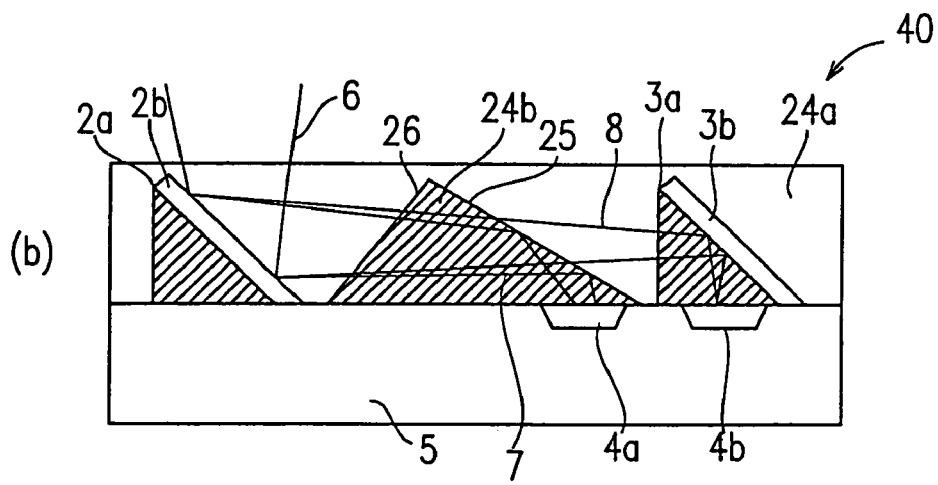
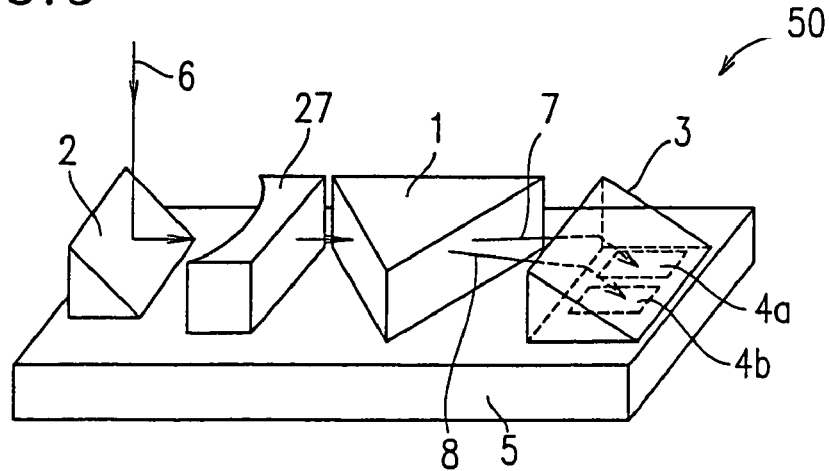
FIG. 9

FIG. 12
(a)
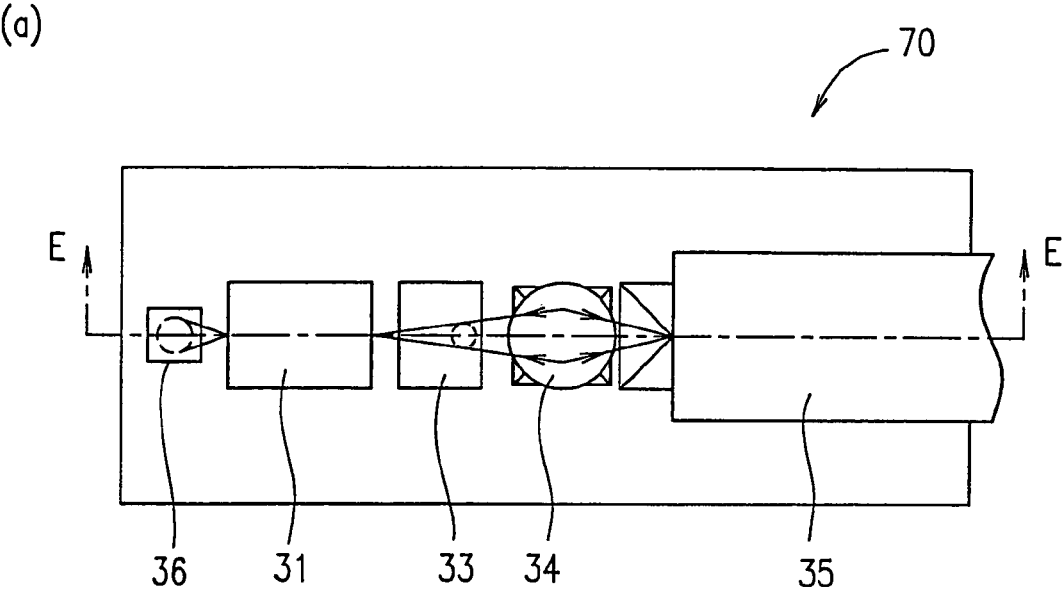
(b)
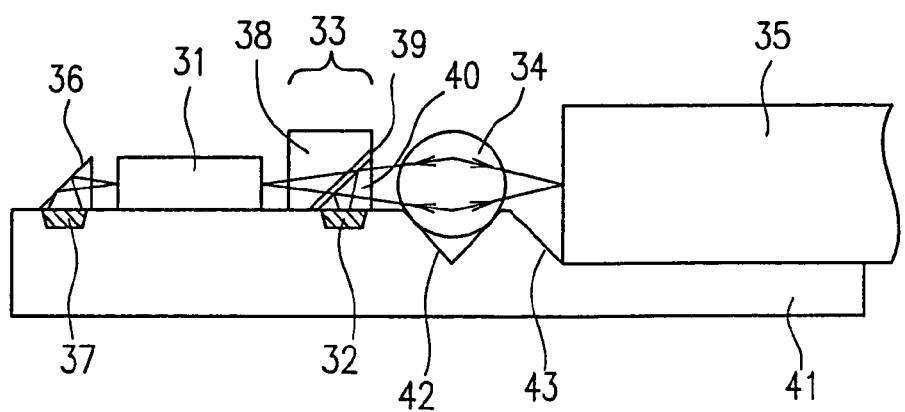

FIG.13
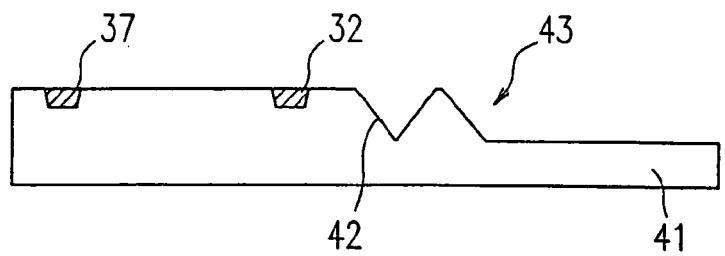
(a)
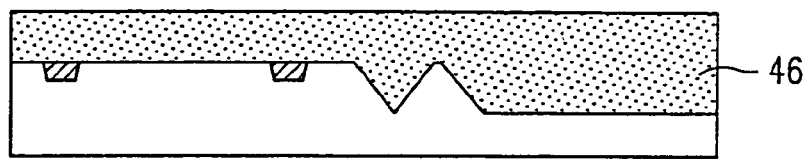
(b)
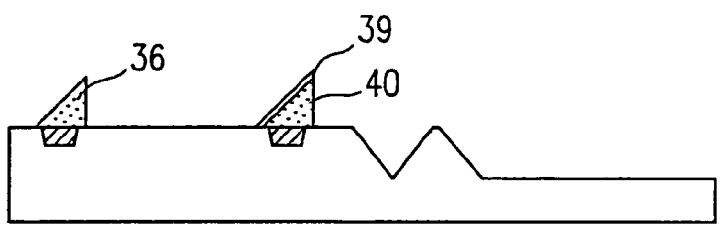
(c)
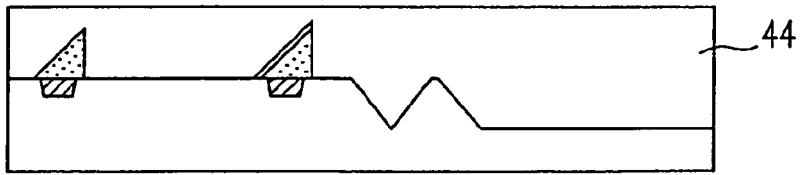
(d)
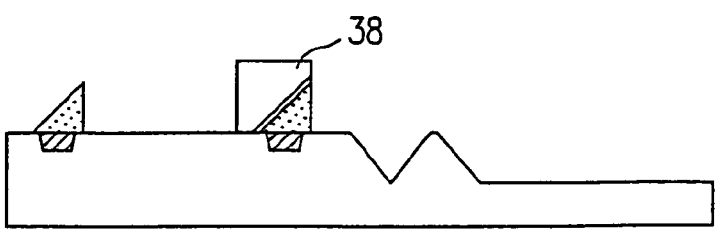
(e)
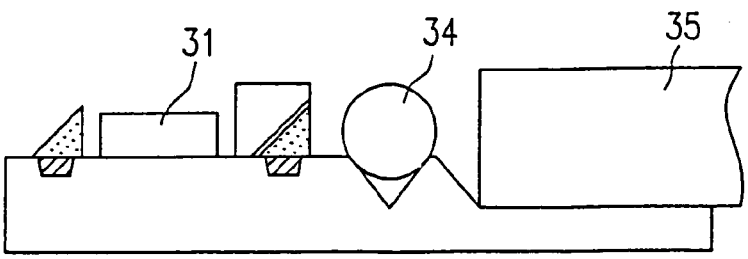
(f)

FIG.17
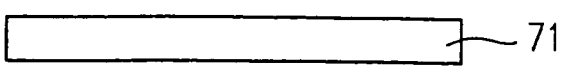
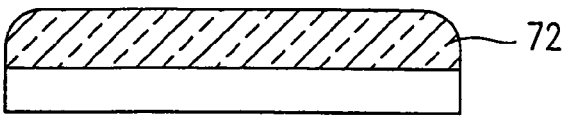
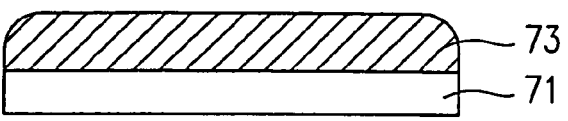
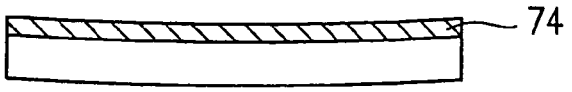
FIG.18
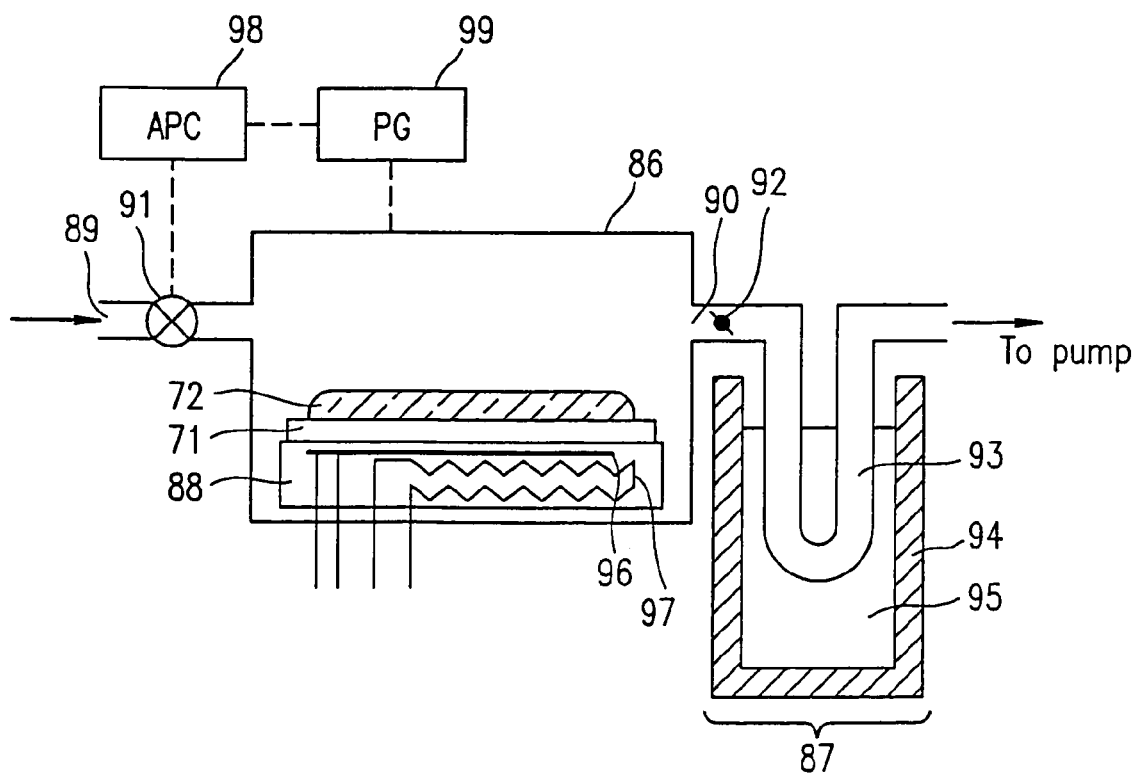

OPTICAL COMPONENT AND METHOD FOR PRODUCING THICK POLYIMIDE FILM

TECHNICAL FIELD

The present invention relates to an optical component for use in an optical pickup, optical communications, and the like. The present invention also relates to a method for producing a thick polyimide film.

BACKGROUND ART

There has been a demand for development of small-size, light-weight and high-performance optical devices as portable electronic apparatuses are becoming practical. Conventionally, as representative optical devices, bulk type optical devices and light waveguide type optical devices have been known. The bulk type optical devices are optical devices into which a variety of optical components are incorporated. The light waveguide type optical devices are optical devices which are used for communication, and the like, and are formed on a substrate.

A bulk type optical device is described in Japanese Laid-Open Publication No. 6-20297. An optical pickup 52 which is such a bulk type optical device is shown in FIG. 15. In the optical pickup 52, a plurality of optical system members, which constitute the optical system of the optical pickup 52, are fixed at a housing 51 whose upper side is open. A semiconductor laser 53 as a light source and a collimator lens 54 for causing laser light (light beam) to be parallel light are provided at a predetermined position outside the housing 51. A spot lens 58 for detecting a signal and an attachment substrate 59 are provided inside the housing 51. On the attachment substrate 59, a Wollaston prism 55 which is a type of polarizing prism, a composite prism 56 for refracting laser light emitted from the above-described semiconductor laser 53, and a mirror 57 are mounted. Note that the above-described optical system members 55 through 57 are made of optical glass, for example. The Wollaston prism 55, the composite prism 56, and the mirror 57 are adhered and fixed at predetermined positions on the upper side of the attachment substrate 59, which is made of the same composition as that of the optical system members, using an adhesive for optical glass. The above-described optical system members 55 through 57 can be fixed with high precision to the attachment substrate 59 by adjusting their mount positions and angles using amounting jig (not shown). The upper and lower surfaces of the above-described attachment substrate 59 are flat planes parallel to each other. The spot lens 58 is housed in a lens holder 58a which is fixed at the inside surface of a side of the housing 51.

Optical components (a lens, a mirror, a prism, a diffraction grating, etc.) in a bulk type optical device are produced by a process such as polishing or molding. The size of the optical components is usually of the order of several millimeters. Therefore, there is a limit on the miniaturization of an optical device comprising these components.

If the size of each optical component is further reduced, the cost of the component is increased and the mount precision is made stringent. A bulk type optical device is produced by arranging and assembling optical components which have been separately produced. In this case, the greater the number of optical components, the greater the number of steps. Further, it is difficult to perform positioning with high precision.

To solve the above-described problem with bulk type optical devices, light waveguide type optical devices have been proposed.

The following stringent conditions are required for light waveguide type optical devices: (1) a small loss of light; (2) ease of production; (3) controllability of the difference in refractive index between a core layer and a cladding layer; (4) excellent heat resistance; and (5) a small difference in birefringence.

A quartz-based light waveguide requires a process at a high temperature of 1000° C. or more in the production thereof. For this reason, there are some problems, such as a substrate on which a light waveguide is formed is limited, a light waveguide cannot be formed after optical components have been mounted on the substrate, and the like.

In contrast, a plastic light waveguide, which can be formed at a low temperature, has been recently proposed. However, the plastic light waveguide has drawbacks, such as poor heat resistance and the like. A low birefringent polyimide, which is the most heat resistant plastic and which is clear and colorless, has been proposed as an exemplary material for light waveguide type optical components in Japanese Laid-Open Publication No. 8-134211. Such a polyimide light waveguide is generally produced by the following method. A polyimide precursor solution is applied to a semiconductor substrate made of silicon, gallium arsenide, or the like, or an optical substrate made of quartz, glass, or the like by spin coating or printing, followed by heating to evaporate a solvent, and curing, thereby preparing a polyimide thin film. Further, a polyimide waveguide is obtained via optional processes, such as wet etching, dry etching, laser ablation, and the like. With the above-described steps, a polyimide thin film having a thickness of several µm or so can be advantageously produced.

Generally, in a light waveguide, light is confined within a core having a size as small as several µm, thereby various optical functions are achieved. A light waveguide contributes to integration and miniaturization of an optical system. A plurality of light waveguide type optical components can be simultaneously produced by a process, such as photolithography, etching, and the like, and positioning precision for the light waveguide type optical components is high.

However, the core size of a light waveguide type optical component is as small as several µm. Therefore, a technique for aligning the light waveguide with other optical components on the order of micro meters is required for coupling light with the core. Thus, a reduction in assembling cost is required. For this reason, current light waveguide type optical components are mainly limited to applications in which a single mode optical fiber.

Moreover, in light waveguide type optical devices, non-uniformity in core size and/or light loss due to scattering at core interface is great and it is therefore difficult to mass-produce optical devices having low loss and consistent performance.

Further, in light waveguide type optical devices, even if a core and cladding are made of isotropic materials, birefringence easily develops due to distortion in the shape of the waveguide core or variations in the refractive index of the cladding. As a result, difference in propagation time between polarized light beams occurs, which creates distortion in a signal. It is therefore difficult to use light waveguide type optical devices as light transmission devices.

The present invention is provided to solve the above-described problems by means of technical philosophy which is absolutely different from the above-described bulk type and waveguide type optical devices. The objective of the present invention is to provide a small-sized and light-weight bulk type optical component.

DISCLOSURE OF THE INVENTION

To solve the above-described problems, a polymer material is used for a bulk type optical component, so that an inexpensive, small, and light bulk type optical component which can be mass-produced and whose quality is stable can be produced.

To this end, an optical component according to the present invention comprises a substrate, and at least one optical element obtained by processing at least one thick optical film provided on the substrate, wherein the optical component has a plurality of surfaces substantially not parallel to a surface of the substrate.

Light may be reflected, refracted, diffracted, or transmitted by a surface of the optical element substantially not parallel to the surface of the substrate, so that light propagating in a direction substantially parallel to the surface of the substrate may be generated or the optical path of light propagating in a direction substantially not parallel to the surface of the substrate is controlled.

The thickness of the thick optical film may be in the range of 50 to 300 μm.

The thick optical film may consist of an optical anisotropic material having an optical axis normal to the surface of the substrate, and the optical element may be a polarization splitting prism for splitting incident light into two orthogonal polarized light beams.

The optical element may be made of two thick optical films having different optical characteristics, and the optical element may split light at an interface between the two thick optical films.

The optical element may be made of two thick optical films having different optical characteristics, one of the two thick optical films may be made of an optical isotropic material and the other of the two thick optical films may be made of an optical anisotropic material, and the refractive index of the optical isotropic material may be equal to one of the refractive indexes of the optical anisotropic material for two orthogonal polarized light beams.

The optical element may be provided between the thick optical films, and further comprises an optical thin film for splitting light.

The optical element may be a mirror for converting the propagation direction of light from a direction substantially normal to the surface of the substrate to a direction substantially parallel to the surface of the substrate, or vice versa.

The substrate may have a guide for mounting the optical element.

The thick optical film may be made of a polymer material.

The polymer material may be polyimide.

The optical elements may have different functions.

The thick optical film may be made of an optical anisotropic material having an optical axis normal to the surface of the substrate. At least one of the optical elements may be a polarization splitting prism for splitting incident light into two orthogonal polarized light beams, and at least another one of the optical elements may be a mirror for converting the propagation direction of light from a direction substantially normal to the surface of the substrate to a direction substantially parallel to the surface of the substrate, or vice versa.

The polarization splitting prism and the mirror may be integrated with the optical component.

The optical element may be a cylindrical concave lens.

The cylindrical concave lens may be made of an optical anisotropic material.

The cylindrical concave lens may be made of an optical isotropic material.

The mirror may be a convex surface mirror having a curved surface.

The convex surface mirror may be made of the same material as that of the other optical elements.

An optical component according to the present invention comprises a substrate, and at least one optical element obtained by processing at least one thick optical film provided on the substrate, wherein the optical component has a plurality of surfaces substantially not parallel to a surface of the substrate, and light is reflected, refracted, diffracted, or transmitted by a surface of the optical element substantially not parallel to the surface of the substrate, so that light propagating in a direction substantially parallel to the surface of the substrate is generated or the optical path of light propagating in a direction substantially not parallel to the surface of the substrate is controlled. The light propagating in the direction substantially parallel to the surface of the substrate is propagated within the at least one optical element or between the at least one optical element without the light being reflected by a surface of the at least one optical component parallel to the surface of the substrate.

A method for producing a thick polyimide film consisting of one layer having a thickness of 50 μm or more, comprises the steps of applying varnish consisting of polyamic-acid and a solvent, forming a thick polyamic acid monolayer by heating the varnish under a pressure of one atmosphere or more at a temperature at which thermal conversion of the polyamic acid to imide does not occur, wherein the solvent is removed by evaporation, and forming the thick polyimide film by thermally converting the thick polyamic acid monolayer to imide.

A method for producing a thick polyimide film consisting of one layer having a thickness of 50 μm or more, comprises the steps of applying varnish consisting of polyamic acid and a solvent, forming a thick polyamic acid monolayer by drying the polyamic acid, and forming the thick polyimide film by thermally converting the thick polyamic acid monolayer to imide.

BRIEF DESCRIPTION OF THE DRAWINGS

FIG. 1 is a perspective view showing an optical device according to a first embodiment of the present invention.

FIG. 2(a) is a top view showing the optical device of the first embodiment of the present invention. FIG. 2(b) is a cross-sectional view, taken along line A—A in FIG. 2(a).

FIG. 3(a) is a perspective view showing a variation of the optical device of the first embodiment of the present invention. FIG. 3(b) is a top view of the variation. FIG. 3(c) is a cross-sectional view, taken along line X—X in FIG. 3(b).

FIGS. 4(a) through 4(d) are step diagrams for explaining a method for producing the optical device of the first embodiment.

FIGS. 5(a) and 5(b) are diagrams for explaining casting using a roller.

FIG. 7(a) is a perspective view showing an optical device according to a second embodiment of the present invention. FIG. 7(b) is a top view of the optical device. FIG. 7(c) is a cross-sectional view, taken along line C—C in FIG. 7(b).

FIG. 8(a) is a top view showing an variation of the optical device of the second embodiment of the present invention. FIG. 8(b) is a cross-sectional view, taken along line D—D in FIG. 8(a).

FIG. 9 is a perspective view showing an optical device according to a third embodiment of the present invention.

FIG. 12(a) is a top view showing an optical device according to a fifth embodiment of the present invention. FIG. 12(b) is across-sectional view, taken along line E—E in FIG. 12(a).

FIGS. 13(a) through 13(f) are step diagrams showing a method for producing the optical device of the fifth embodiment.

FIGS. 17(a) through 17(d) are diagrams showing another exemplary method for producing a thick polyimide film.

FIG. 18 is a diagram showing an exemplary drying apparatus used to produce a thick polyimide film.

BEST MODE FOR CARRYING OUT THE INVENTION

Hereinafter, the optical component of the present invention will be described.

The optical component of the present invention has characteristics of a bulk type optical component, i.e., small light loss, ease of positioning a plurality of optical elements, and ease of analyzing and designing optical characteristics. In addition, the optical component of the present invention can be small. Specifically, the optical component of the present invention is achieved by forming optical elements by processing a thick optical film made of an optical material on a substrate.

Preferably, in the optical component, the thickness of the thick optical film is in the range of 50 μm to 300 μm. The reason of this will be described below.

The reason the thickness of the thick optical film is preferably greater than or equal to 50 μm is that if the thickness of the thick optical film is less than 50 μm, a light beam propagates within an optical element and between optical elements while the light beam is repeatedly reflected by a pair of side walls parallel to a propagation direction in a manner similar to that of a waveguide type optical component, so that light loss is likely to occur.

Figure 14:
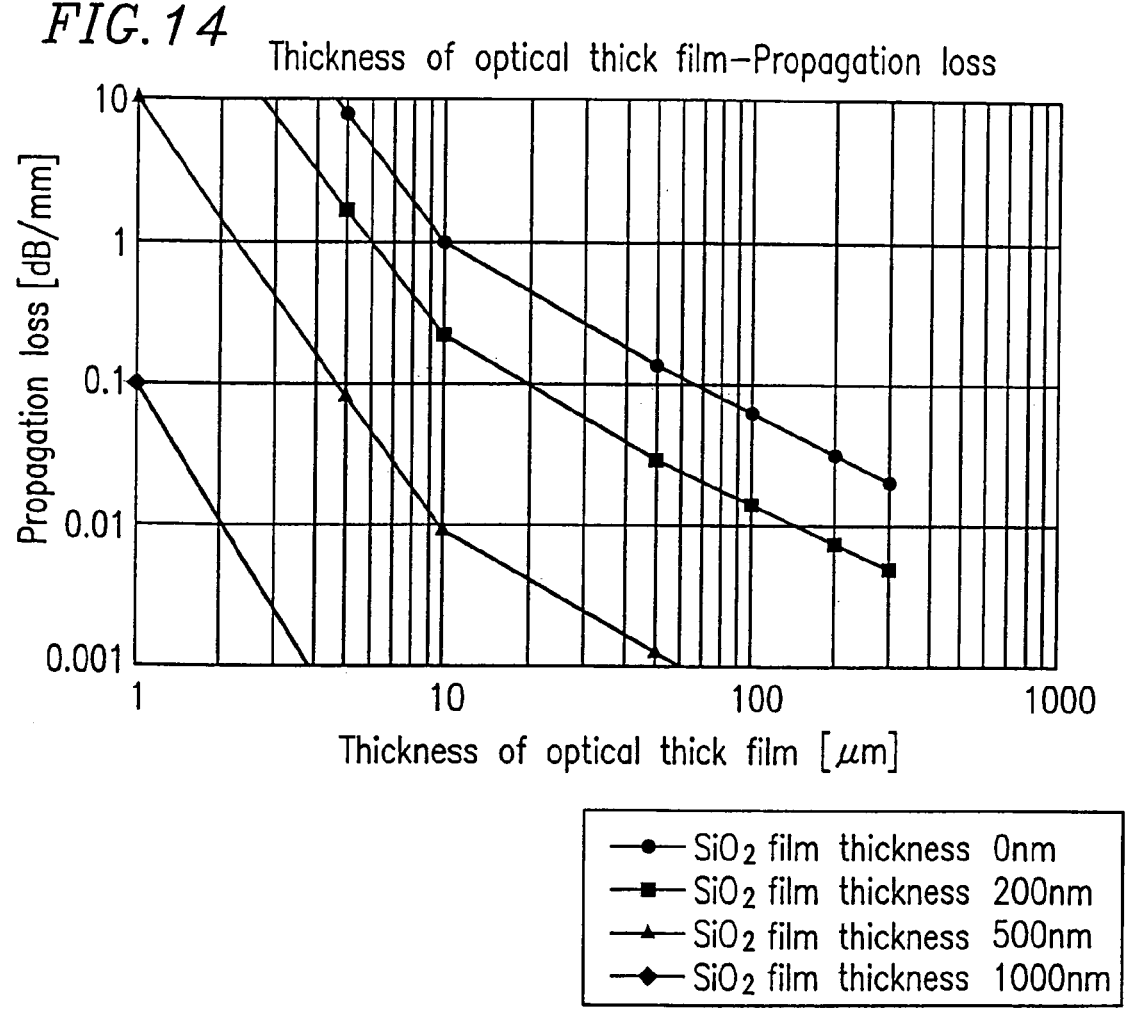
FIG. 14 is a graph showing the relationship between the thickness of a thick optical film and propagation loss.
Figure 15:
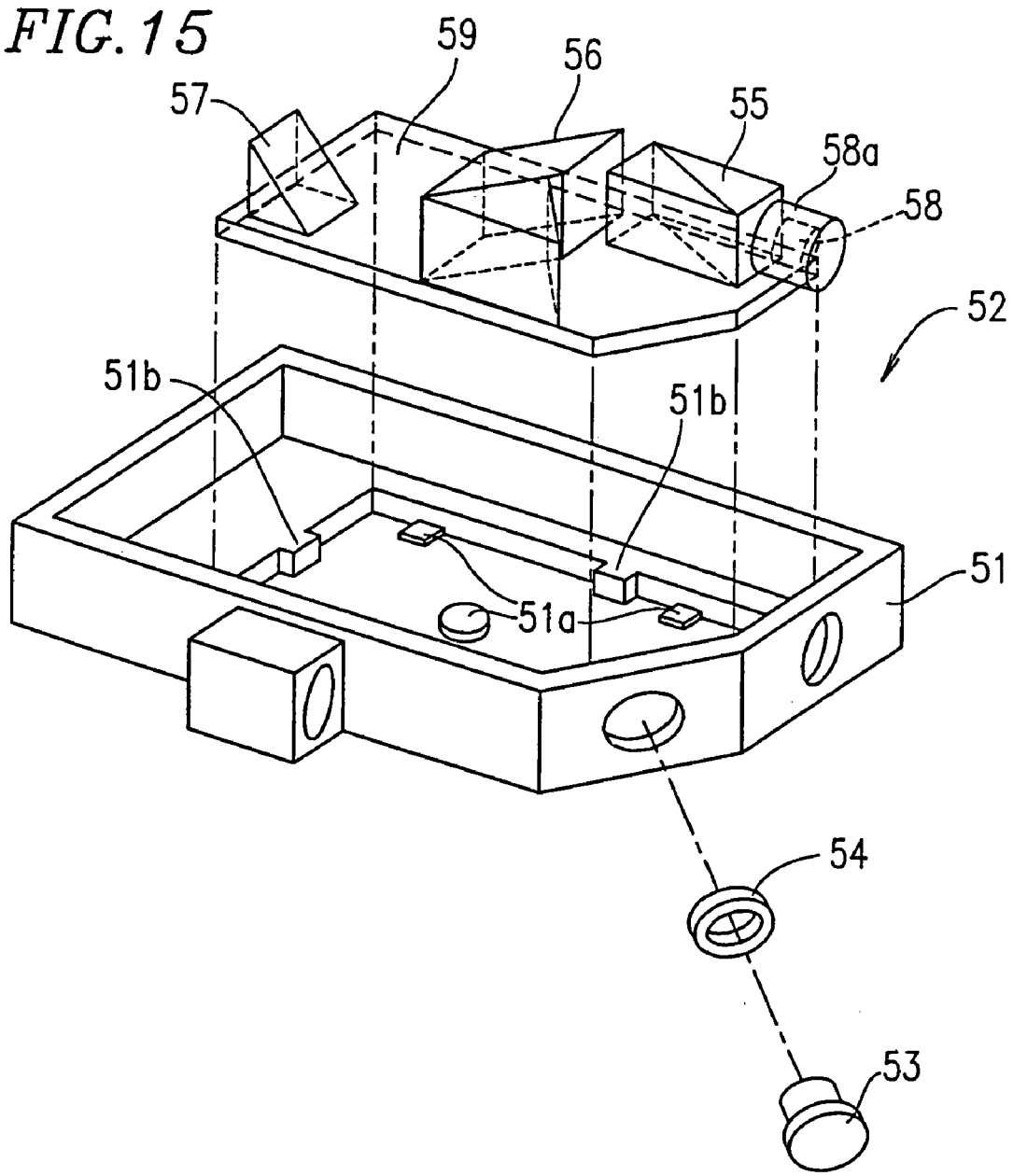
FIG. 15 is a cross-sectional view showing a conventional optical device.

FIG. 14 shows the relationship between the thickness of the thick optical film and propagation loss when a light beam propagates within optical material (refractive index: 1.55) provided on a silicon substrate. Note that in FIG. 14, a SiO₂ film having a different thickness (0 nm, 200 nm, 500 nm, and 1000 nm) is interposed between the silicon substrate and the optical material. As can be seen from FIG. 14, the greater the thickness of the thick optical film (i.e., the optical material), the smaller the propagation loss of light. Further, the greater the thickness of the interposed SiO₂ film, the smaller the propagation loss. When the thickness of the thick optical film is greater than or equal to 50 μm, the loss is about 0.1 dB/mm independent of whether or not a SiO₂ film is interposed between the substrate and the optical material, thereby obtaining good characteristics.

Moreover, when the thickness of the optical material is greater than or equal to 50 μm, it is easy to align the optical elements.

The reason the thickness of the thick optical film is preferably smaller than or equal to 300 μm is that a stress occurs within the film as the thickness of the thick optical film is increased, and when the thickness of the thick optical film is greater than or equal to 300 μm, the amount of damage to the substrate due to the stress within the film cannot be ignored.

FIG. 1 is a perspective view showing an optical device 10 according to a first embodiment of the present invention. FIG. 2(a) is a top view of the optical device 10. FIG. 2(b) is a cross-sectional view, taken along line A—A in FIG. 2(a).

In this specification, an optical component is defined as a component of an optical device. Hereinafter, an optical device mainly having a light receiving function will be described by way of specific examples, but the optical component of the present invention is not limited to an optical device having a light receiving function. The present invention relates to an optical component comprising an optical element capable of controlling light.

The optical device 10 comprises a polarization splitting prism 1, a first mirror 2, a second mirror 3, photodiodes 4a and 4b as light receiving elements, and a silicon substrate 5. The polarization splitting prism 1, the first mirror 2, and the second mirror 3 are provided on the silicon substrate 5. The photodiodes 4a and 4b are provided within the silicon substrate 5. The polarization splitting prism 1 is provided between the first mirror 2 and the second mirror 3. The second mirror 3 is provided on the photodiodes 4a and 4b.

Light 6 enters the optical device 10 in a direction normal to the substrate surface thereof. The optical path of the light 6 is bent by the first mirror 2 to be converted into light propagating substantially parallel to the substrate surface, and is introduced into the polarization splitting prism 1. The polarization splitting prism 1 is made of a birefringent material. This birefringence results in light (TE light) 7 having a vibration plane parallel to the substrate and light (TM light) 8 having a vibration plane perpendicular to the substrate being output by the polarization splitting prism 1. When light enters the prism 1 at a large incidence angle, the incident light 6 is split within the prism into two polarized light beams 7 and 8 having different refraction angles. The optical paths of the polarized light beams 7 and 8 are bent by the second mirror 3 and introduced into the photodiodes 4a and 4b which in turn generate electric signals depending on the intensity of the respective polarized light beams.

This polarization splitting prism 1 is made of polyimide having a thickness of 50 to 300 μm (200 μm in this embodiment). Generally, it is known that after being applied and cured, polyimide exhibits optical anisotropy having an optical axis in a direction normal to a plane. For example, fluorinated polyimide OPI-N2005 (manufactured by Hitachi Chemical Co., Ltd.) has a refractive index of 1.62 for TE light with a wavelength of 780 nm, and a refractive index of 1.51 for TM light with a wavelength of 780 nm. The difference in refractive index between TE and TM light is 0.11, i.e., which is very large. Due to such a large difference in refractive index, polarization splitting can be effectively performed. For example, if the incident light 6 enters the polarization splitting prism 1 having an apical angle of 60 degrees at an incidence angle of 50 degrees, the incident light 6 is refracted at two surfaces, through one of which the light 6 enters the prism 1 and through the other of which the light 6 goes out of the prism 1, so that the light 6 emitted from the prism 1 is split into polarized light beams having an separation angle of 10 degrees therebetween. In this case, the optical quenching ratio is greater than or equal to −20 dB and is thus extremely good.

The first mirror 2 provided on the substrate 5 along with the polarization splitting prism 1 is produced by forming a reflection film 2b on a inclined surface 2a of the thick polyimide film. In this embodiment, the inclined surface is designed to have an angle of 45 degrees. The mirror 3 is provided in a similar manner. These optical components are produced by a method, such as laser ablation, reactive ion etching, and the like, after a polyimide film having a thickness of 50 to 300 μm has been provided.

In the optical device 10, the incidence angle of the incident light 6 to the polarization splitting prism 1 is as large as 50 degrees, large reflection loss occurs at the incident surface of the polarization splitting prism 1. To prevent this loss, an antireflection film may be provided on each of the light entering surface and light outgoing surface of the polarization splitting prism 1. Alternatively, as in an optical device 20 shown in FIG. 3, the polarization splitting prism 1 may be integrated with the mirror 3. The optical device 20 has the same configuration as that of the optical device 10, except that the polarization splitting prism 1 is integrated with the mirror 3. In the optical device 20, polarization splitting is performed only by light being transmitted through one surface (i.e., a surface through which the incident light 6 enters the polarization splitting prism 1), so that a separation angle cannot be large. However, as compared to the optical device 10, the number of surfaces through which light passes is reduced by two (i.e., the light outgoing surface of the polarization splitting prism 1 and the light entering surface of the second mirror 3), thereby making it possible to reduce reflection loss. Note that FIG. 3(a) is a perspective view showing the optical device 20 which is a variation of the first embodiment. FIG. 3(b) is a top view showing the optical device 20. FIG. 3(c) is a cross-sectional view, taken along line X—X in FIG. 3(b).

Next, a method for producing the optical device 10 of the first embodiment will be described with reference to FIGS. 4(a) through 4(d). FIGS. 4(a) through 4(d) are cross-sectional views showing steps of producing the optical device 10.

Referring to FIG. 4(a), signal detection photodiodes 4a and 4b, and a circuit for detecting signals therefrom (not shown) are formed on the silicon substrate 5 by a semiconductor process. On the resultant structure, a light transmissive plastic layer 11 is formed. The light transmissive plastic layer 11 may be made of polyimide, for example. The thickness of the light transmissive plastic layer 11 may be set to about 200 μm, for example. The light transmissive plastic layer 11 is formed by applying polyimide by spin coating or casting using a roller, followed by baking to cure the polyimide. Alternatively, a film of polyimide may be adhered onto the silicon substrate 5 via an adhesive or the like.

Next, as shown in FIG. 4(b), portions of the light transmissive plastic layer 11 are removed by etching, leaving a polarization splitting prism 1, a 45°-inclined surface 2a of a first mirror 2, and a 45°-inclined surface 3a of the second mirror 3. Examples of an etching method include reactive ion etching, laser ablation etching, and the like. Particularly, laser ablation etching is suitable for processing polymer materials, in which processing speed is high, photolithography is not required, and processing precision is great. A 45°-inclined surface may be preferably formed by laser ablation etching.

Next, as shown in FIG. 4(c), a reflection film 12 is formed by sputtering, vacuum deposition, or the like. The reflection film 12 may be preferably made of metal, such as gold, aluminum, and the like, or a dielectric multilayer film.

Finally, as shown in FIG. 4(d), portions of the reflection film 12 are removed by photolithography and etching, excluding the reflection film 12 on the inclined surfaces of the first and second mirrors 2 and 3, i.e., leaving only the reflection films 2b and 3b on the respective inclined surfaces 2a and 3a of the first and second mirrors 2 and 3. Thus, the optical device 10 is completed.

Hereinafter, as a method for forming polyimide shown in FIG. 4(a), casting using a roller will be described with reference to FIG. 5. According to the application method, as shown in FIG. 5(a), polyimide varnish 11 is placed on the substrate 5 and is developed by a roller 13. Thereby, as shown in FIG. 5(b), a polyimide film having a uniform thickness is provided on the substrate 5. The thickness of the polyimide film can be determined by adjusting the gap g between the roller 13 and the substrate 5, thereby making it possible to form a thick film of greater than 100 μm which is difficult to produce by spin coating. Particularly, a resin having a low stress and a high viscosity is suitable for formation of a thick film of greater than 100 μm. Note that another method for producing polyimide (plastic layer 11) of FIG. 4(a) will be described in Example 6.

Figure 6:
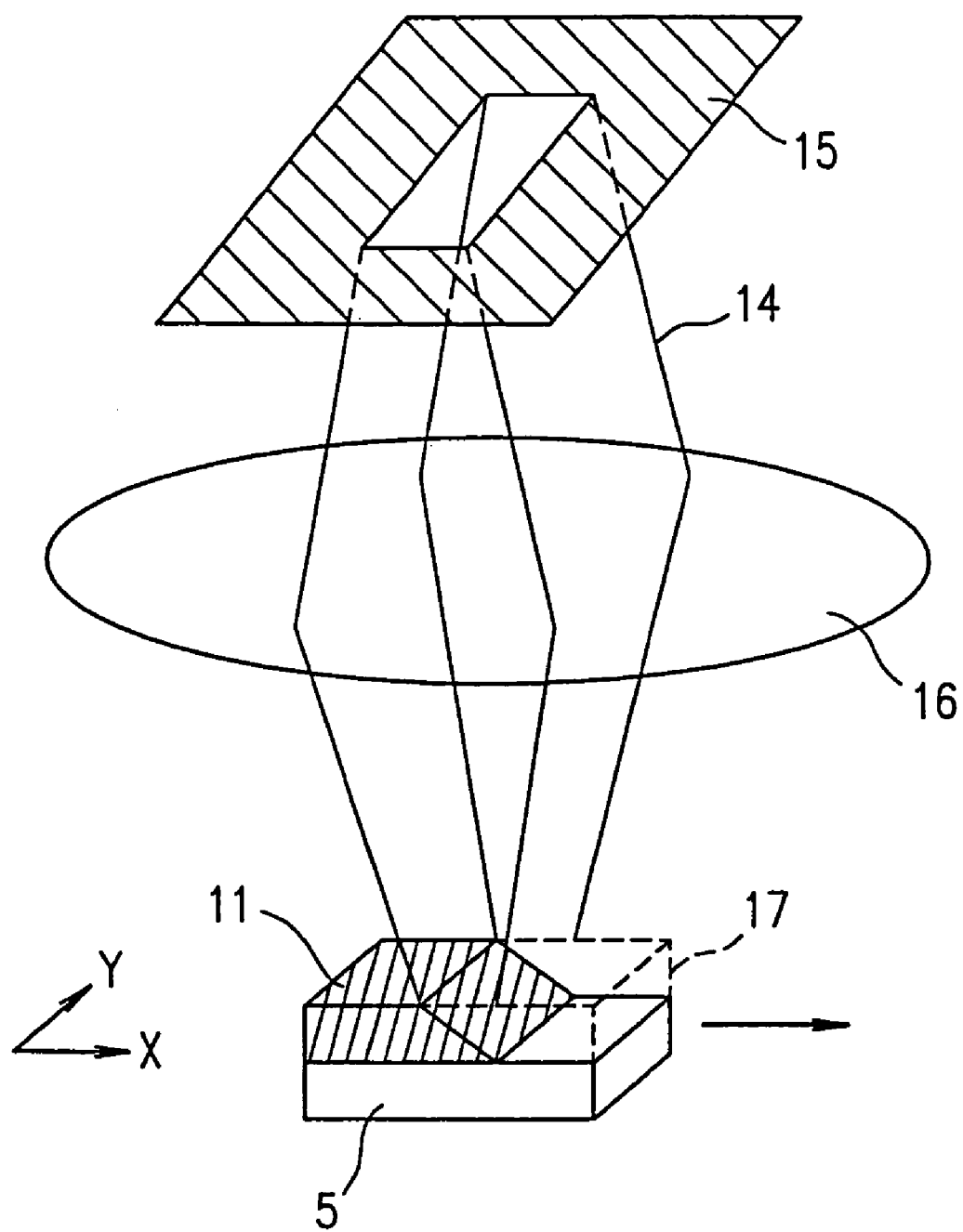
FIG. 6 is a diagram for explaining formation of a 45°-inclined surface by laser ablation.

Laser ablation etching for producing a 45°-inclined surface mentioned in the above-described process will be described with reference to FIG. 6.

An excimer laser beam 14 is passed through a laser ablation mask 15 whose transmission region is in the shape of a rectangle. The transmitted excimer laser beam 14 is converged by a lens 16 so as to impinge on a workpiece 17. Thereafter, the workpiece 17 is moved in a direction X while being irradiated with the beam 14, so that the workpiece 17 is etched from the right. An etched region is indicated by a dashed line. When the irradiation with the laser beam 14 is stopped while still moving the workpiece 17, there is a difference in the total amount of irradiation with the laser beam between the right and left portions of the irradiated region. For this reason, the etching amount varies, resulting in an inclined surface. By adjusting the intensity of the excimer laser beam and the moving speed of the workpiece, an inclined surface having any angle can be formed. The optical devices 10 and 20 of the above-described embodiments are smaller and lighter than conventional bulk type optical devices. Further, light loss is reduced and positioning of a plurality of optical elements can be facilitated.

Particularly, the polarization splitting prism 1 in this embodiment (and a second embodiment described below) has the following advantages over conventional examples as described below.

Conventionally, as an optical element having a polarization splitting function, a Wollaston prism has been used. A Wollaston prism is produced by bonding uniaxial anisotropic optical crystals. The size of a Wollaston prism is at least 2 to 3 mm per side, and the price is high due to the use of the optical crystal. A typical optical pickup for magneto-optic disks comprises a Wollaston prism used for polarization splitting to detect a magneto-optic signal, which is partly responsible for preventing miniaturization of an entire optical pickup, and cost reduction.

A device having the same function, which is achieved using a light waveguide technique, has been proposed. In this case, since light has to be coupled with a light waveguide having a thickness of 1 µm, a technique for aligning a light waveguide element with another optical component other than the light waveguide on the order of sub-microns is required. Therefore, it is difficult to reduce manufacturing cost. Moreover, in a light waveguide, there are challenges to prevent light absorption of a light waveguide core material, light loss in a waveguide due to scattering at the core interface, and fluctuation in characteristics due to variations in the thickness of the light waveguide.

As compared with the above-described Wollaston prism whose size is several millimeters, the polarization splitting prism 1 of this embodiment is 50 to 300 µm in thickness and several hundreds micrometers per side in length, i.e., the size thereof is greatly reduced. Further, optical components, such as a photodetector, a mirror, a prism, and the like, can be integrated on a substrate by a series of processes, thereby making it possible to reduce the scale of the optical system, the number of steps for assembling an optical component, and production cost. The precision of positioning an optical component is dependent on the precision of positioning a mask in photolithography and the processing precision of a laser ablation processing apparatus. Therefore, the precision of positioning an optical component is of the order of microns, i.e., an excellently high level, so that a high-performance optical device can be obtained.

Further, whereas light has to enter a 1 µm-thick thin film in a light waveguide type polarization splitting element, the thickness of the thick optical film of the present invention is as great as 50 to 300 µm, so that it is easy for light to enter and it is also easy to align the elements made of the film with other optical components. Light loss is caused substantially only by a material. Therefore, by selecting a transparent material, the light loss can be reduced to a negligible value.

FIG. 7(*a*) is a perspective view showing an optical device 30 according to a second embodiment. FIG. 7(*b*) is a top view of the optical device 30. FIG. 7(*c*) is a cross-sectional view, taken along line C—C in FIG. 7(*b*).

The optical device 30 of the second embodiment has two types of thick optical films (a first light transmissive plastic 24*a* and a second light transmissive plastic 24*b*). The optical device 30 is different from the first embodiment in that a polarization splitting element 21 splits light into polarized light beams by utilizing total reflection. The same members as those of the first embodiment are designated by the same reference numerals and the description thereof is omitted.

The optical device 30 comprises a substrate 5, a first mirror 2, a second mirror 22, a third mirror 23, a polarization splitting element 21, and photodiodes 4*a* and 4*b*. The first mirror 2, the second mirror 22, the third mirror 23, and the polarization splitting element 21 are made from the second light transmissive plastic 24*b*(produced by a technique similar to that described above in the first embodiment). These portions are covered with the first light transmissive plastic 24*a*. The photodiodes 4*a* and 4*b* are provided within the substrate 5. The second mirror 22 and the third mirror 23 are provided on the photodiodes 4*a* and 4*b*, respectively.

The first light transmissive plastic 24*a* is made of an isotropic material, while the second light transmissive plastic 24*b* is made of the optical anisotropic material described in the first embodiment. Further, the lower refractive index of the second light transmissive plastic layer 24*b* is substantially equal to the refractive index of the first light transmissive plastic layer 24*a*. As a result, one of the polarized light beams is not reflected on the interface of these layers, while the other polarized light beam is not transmitted through the interface of these layers at a predetermined incidence angle or more.

The above-described principle is applied to the polarization splitting element 21. Specifically, a wall surface 21*a* of the polarization splitting element 21 made from the second transmissive plastic 24*b* intersects an optical path from the first mirror 2 with a certain angle, and the first transmissive plastic 24*a* is provided adjacent to the wall surface 21*a*. Thereby, one of the polarized light beams is not reflected on the wall surface 21*a*, while the other polarized light beam is not transmitted through the wall surface 21*a*. In other words, polarized light beams can be separated from each other. For example, an isotropic material having a refractive index of 1.51 is selected as a material for the first light transmissive plastic 24*a*, while an anisotropic material having a refractive index of 1.62 for TE light and a refractive index of 1.51 for TM light is selected as a material for the second light transmissive plastic 24*b*. In this case, when light enters the wall surface 21*a* at an incidence angle of 70 degrees, the TE light 7 is totally reflected, while the TM light 8 is transmitted. The polarized light beams are brought to the second mirror 22 and the third mirror 23, and the optical paths thereof are bent by the mirrors, so that the beams are introduced into the photodiodes 4*a* and 4*b*, respectively.

In the optical devices 10 and 20 in the first embodiment, both polarized light beams (TE light and TM light) have large refraction angles, so that a high level of aberration occurs. As a result, the spot diameters of the polarized light beams are great. However, in this embodiment, one of the polarized light beams is reflected, while the other polarized light beam is transmitted without substantial bending. Therefore, substantially no aberration occurs and small spot-diameter light beams are incident on the photodiodes. Further, one of the polarized light beams is totally reflected, while there is no difference in refractive index for the other polarized light beam. As a result, reflection loss is zero at the wall surface 21*a*.

Note that as a variation of the optical device of the second embodiment, polarization splitting may be performed in a direction normal to a substrate surface as shown in FIG. 8.

FIG. 8(*a*) is a top view of an optical device 40. FIG. 8(*b*) is a cross-sectional view of the optical device 40, taken along line D—D of FIG. 8(*a*). The optical axis of the second light transmissive plastic 24*b*, which is made of an anisotropic material, is normal to a substrate surface, and the cross-section thereof is in the shape of a triangle. The first light transmissive plastic 24*a*, which is made of an isotropic material, covers the first light transmissive plastic layer 24*a*. The second light transmissive plastic 24*b* has a refractive index of 1.62 for TE light and a refractive index of 1.51 for TM light, while the first light transmissive plastic 24*a* has a refractive index of 1.51. Reference numeral 26 indicates an interface between the polarization splitting element 21 made from the second light transmissive plastic 24*b* and the first light transmissive plastic 24*a*, through which the incident light 6 enters the polarization splitting element 21. Reference numeral 25 indicates another interface therebetween, through which polarized light 8 is emitted from the polarization splitting element 21. The angles of inclination of the interfaces 26 and 25 are 45 degrees and 20 degrees, respectively.

In this case, the TE light 7 is refracted by the first interface 26, is totally reflected by the second interface 25, and is guided into the photodiode 4*a*. The TM light 8 which passes through the first and second interfaces 26 and 25, is reflected by the mirror 3*b*, and is guided into the photodiode 4*b*. As a result, the mirrors 2 and 3 and the polarization splitting prism 21 can be arranged in a line, such that an area occupied by the optical system can be reduced.

FIG. 9 is a diagram showing a configuration of an optical device 50 according to a third embodiment of the present invention.

The optical device 50 is provided with a cylindrical concave lens 27 which is inserted between the mirror 2 and the polarization splitting prism 1 and has an effect of diverging light in the plane of the substrate. In this point, the optical device 50 is different from the optical device 10 of the first embodiment. Except this point, the optical device 50 has the same configuration as that of the optical device 10. The cylindrical concave lens 27 plays a role in converting incident light having a great numerical aperture to light having a small numerical aperture in the plane of the substrate surface.

The thickness of a thick optical film in the optical device 50 is 50 to 300 μm. Therefore, light 6 entering the optical device 50 has to have a light flux width smaller than or equal to 50 to 300 μm. It is thus necessary to couple converged light with the optical device 50 in the vicinity of the focal point of the converged light.

However, converged light having a great numerical aperture is widely spread after entering the optical device 50. The greater the numerical aperture, the greater the aberration which occurs when light enters the polarization splitting prism 1. Therefore, in this case, the light spots on the photodiodes 4*a* and 4*b* are increased. However, a large-sized photodiode leads to degradation in response performance. Therefore, a small-sized photodiode is preferable. When the angle of spread light is smaller than the separation angle of split polarized light beams, the optical quenching ratio of polarization splitting is degraded.

The spread of light having a small numerical aperture can be reduced to a small size after the light has entered the optical device 50, thereby making it possible to reduce the spot sizes on the photodiodes 4*a* and 4*b*. Further, the optical quenching ratio of polarization splitting can be increased.

Light having a small numerical aperture is introduced through the cylindrical concave lens 27 to the polarization splitting prism 1 in the plane of the substrate, thereby making it possible to prevent the light spots on the photodiodes 4*a* and 4*b* from being enlarged. Since the spread angle can be avoided, polarization splitting can be achieved by a small polarization splitting angle.

The cylindrical concave lens 27 can be produced by patterning with a mask in the shape of a concave lens using lithography and etching. In a similar manner, a one-dimensional diffraction type lens can be produced.

The cylindrical concave lens 27 may be made of an optical isotropic material, or an optical anisotropic material.

Figure 10:
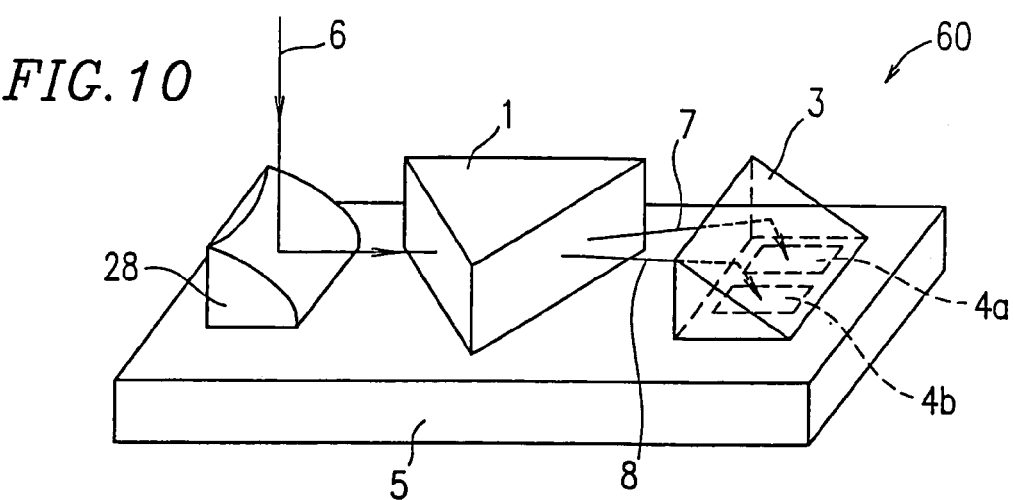
FIG. 10 is a perspective view showing an optical device according to a fourth embodiment of the present invention.

FIG. 10 is a diagram showing a configuration of an optical device 60 according to a fourth embodiment of the present invention.

In this optical device 60, a mirror 28 has a curved surface so as to have a function of bending an optical path, and focusing. In this point, the optical device 60 is different from the optical device 10 of the first embodiment. Except for this point, the optical device 60 has the same configuration as that of the optical device 10.

The curved surface of the mirror 28 is a convex surface. This surface has a lens effect not only with respect to a direction in the plane of the substrate but also a direction normal to the substrate surface. The mirror 28 converts incident light having a great numerical aperture to light having a small numerical aperture in a direction normal to the substrate surface as well as in a direction in the plane of the substrate. Thereby, as compared to the third embodiment, light spot sizes on the photodiodes 4*a* and 4*b* can be further reduced.

Figure 11:
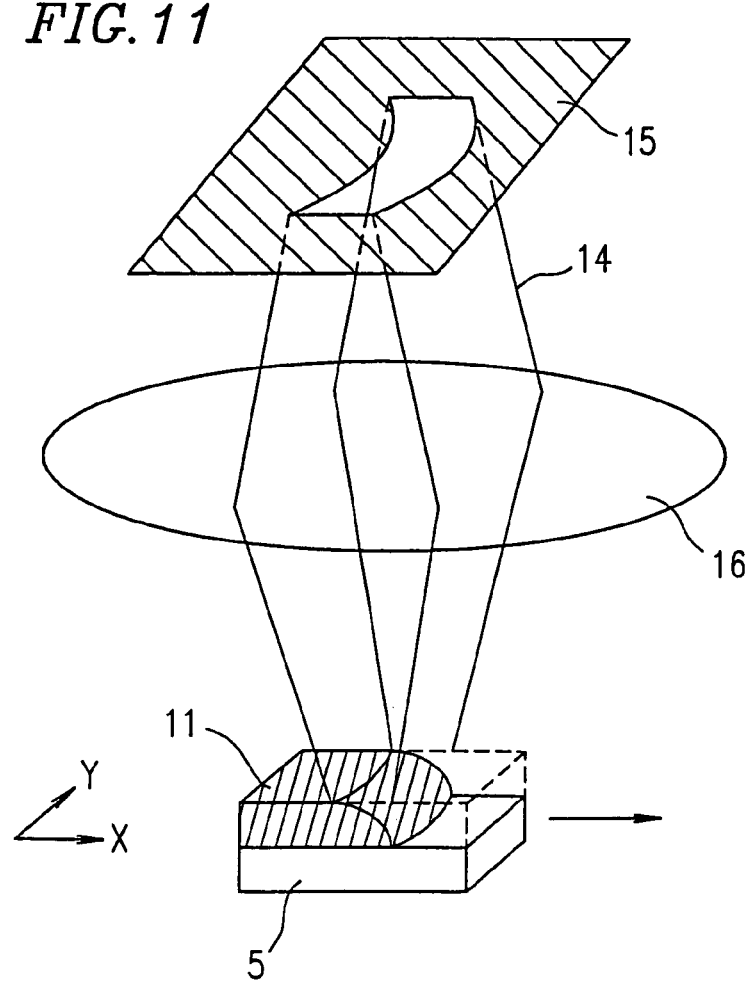
FIG. 11 is a diagram for explaining formation of a curved surface by laser ablation.

A method for producing the convex surface mirror 28 will be described with reference to FIG. 11. A mask 15 is in the shape of a bow. Laser ablation processing is performed while a workpiece (polyimide varnish 11) is moved in the X direction from the left to the right (description of the steps which are the same as those in FIG. 6 are omitted). In this manner, an inclined surface having a convex surface in the Y direction is formed. Further, if the moving speed of the workpiece is not constant but is gradually increased, the inclined surface can also have a convex surface in the X direction. By optimizing the shape of the mask 15 and the moving speed of the workpiece, a convex surface mirror having a desired shape can be obtained.

The mirror 28 may be made of the same material as that of other optical elements.

FIG. 12(*a*) is a top view showing a configuration of an optical device 70 according to a fifth embodiment of the present invention. FIG. 12(*b*) is a cross-sectional view, taken along line E—E of FIG. 12(*a*).

The optical device 70 comprises a semiconductor laser 31 as a light emitting element, a photodiode 32 as a light receiving element, an optical fiber 35, a beam splitter 33 for introducing light emitted from the optical fiber 35 into the photodiode 32, and a ball lens 34 for converging light emitted from the semiconductor laser 31 to an end surface of the optical fiber 35 and converging light emitted from the optical fiber 35 to the photodiode 32. The optical fiber 35 is coupled with each of the opposite ends of the optical device 70.

Light emitted from the semiconductor laser 31 of one optical device 70 is transmitted through the beam splitter 33, is converged by the ball lens 34 to an end surface of the optical fiber 35, and is introduced to the core of the optical fiber 35. The light is then propagated within the optical fiber 35, and is introduced into another optical device 70 provided at the other end surface of the optical fiber 35.

In the other optical device 70, light emitted by the optical fiber 35 is converted by the ball lens 34 to converged light which is in turn reflected by the beam splitter 33 and is introduced into the photodiode 32. The photodiode 32 converts the light to an electric signal. In the beam splitter 33, a functional optical film 39, such as a wavelength selecting film, a polarized light selecting film, and the like, interposes a two-layered structure, i.e., positioned between light transmissive plastics 38 and 40.

The optical device 70 is provided on a silicon substrate 41. In the silicon substrate 41, 45°-inclined surfaces are formed by an isotropic etching. The 45°-inclined surfaces are utilized to form guides for positioning the ball lens 34 and the optical fiber 35. The photodiode 32, the beam splitter 33, a ball lens guide 42, and an optical fiber guide 43 are formed on the substrate with the precision of the photolithography (i.e., ±several micrometers). Such precision is much high as compared to the positioning precision of a typical bulk type optical component which is ±several tens micrometers. The ball lens 34 and the optical fiber 35 are fixed in accordance with the respective guides 42 and 43, whereby a high-level position adjusting technique is not required and an optical device can be easily produced in a short time. Therefore, the manufacturing costs of the optical devices can be greatly reduced.

Since each optical component is very small, the size of the optical device 70 is much smaller than the size of an optical device comprising bulk type optical components. The size of a bulk type beam splitter is at least 2 to 3 mm per side. Therefore, whereas an optical device comprising bulk type optical components is of a size of about 1 cm, the size of the optical device of the present invention having the same function as that of the bulk type optical components can be reduced to about 1 to 2 mm.

An optical device using a light waveguide technique has been proposed. However, this type of device is mainly used to couple light with a single mode optical fiber. With this type of device, it is difficult to couple light with an optical fiber having a great core diameter, such as a plastic fiber, a multimode quartz fiber, and the like, since there is a large difference in core diameter between a light waveguide and an optical fiber. Further, problems, such as light loss in a waveguide, fluctuations in characteristics, and the like, as described above occur. Moreover, in a waveguide, even when an isotropic material is used, birefringence develops due to distortion of the shape of a waveguide core or variations in the refractive index of the cladding, resulting in signal distortion. The optical component of the present invention can be handled in a manner similar to that for a bulk type optical component. Therefore, when the device is made of an isotropic material, orthogonal polarized light beams can have the same propagation speed, thereby making it possible to suppress signal distortion.

Next, a method for producing the optical device of the fifth embodiment will be described with reference to FIGS. 13(*a*) through 13(*f*). FIG. 13(*a*) through 13(*f*) are cross-sectional views of steps of producing the optical device 70.

Firstly, as shown in FIG. 13(*a*), a photodiode 32 for detecting a signal, a photodiode 37 for monitoring a laser output, and a circuit for detecting signals therefrom (not shown) are formed on a silicon substrate 41 by a process for semiconductor. Further, a V-groove guide 42 for fixing a ball lens and a guide 43 for fixing an optical fiber are formed by silicon anisotropic etching.

Thereafter, as shown in FIG. 13(*b*), a light transmissive plastic layer 46 is formed on the above-described structure. As an example of a material for the plastic layer 46, polyimide can be used. The thickness of the plastic layer 46 is about 200 μm, for example. Polyimide may be applied by spin coating or casting using a roller. Note that a specific example of a method for producing a plastic layer 46 made of polyimide will be described in a sixth embodiment below.

Next, as shown in FIG. 13(*c*), the plastic layer 46 is removed by etching, leaving a beam splitter 40 and a mirror 36. Examples of etching include reactive ion etching and laser ablation etching. A 45°-inclined surface is formed by laser ablation etching. The inclined surface is formed by changing time for irradiation of an excimer laser depending on a portion to control the amount of etching.

Further, an optical film 39 (e.g., a wavelength selection film or a polarized light selection film) is formed on the inclined surface of the beam splitter 40 as follows. An optical film is formed by sputtering, vacuum deposition, or the like and thereafter the optical film is removed from unnecessary regions by photolithography and etching, so that the optical film 39 is left only on the inclined surface of the beam splitter 40.

Next, as shown in FIG. 13(*d*), alight transmissive plastic layer 44 is formed again. As a material for the light transmissive plastic layer 44, polyimide or the like can be used, for example.

Next, as shown in FIG. 13(*e*), the light transmissive plastic layer 44 is removed by etching, leaving a beam splitter 38.

Finally, as shown in FIG. 13(*f*), a semiconductor laser 31 is fixed at a position for a semiconductor laser by die bonding, a ball lens 34 is fixed at the ball lens guide 42, and an optical fiber 35 is fixed at the optical fiber guide 43. Thus, the optical device 70 is completed.

An exemplary method for producing a thick polyimide film used for the above-described plastic layer 11 of FIG. 4 and the plastic layers 44 and 46 of FIG. 13 will be described below.

As a means for forming a thick polyimide film on a substrate, a method disclosed in Japanese Patent No. 2607669 is known. In this method, application of polyamic acid varnish on a support substrate, whose surface is activated, and removal of a solvent by heating under a temperature condition, under which the conversion of the polyamic acid to imide is not carried out, are repeated multiple times, so that a polyamic acid applied film having a desired thickness is formed. The resultant substrate is subjected to heat treatment so that polyamic acid is converted to imide, thereby forming a polyimide resin coated layer.

Figure 16:
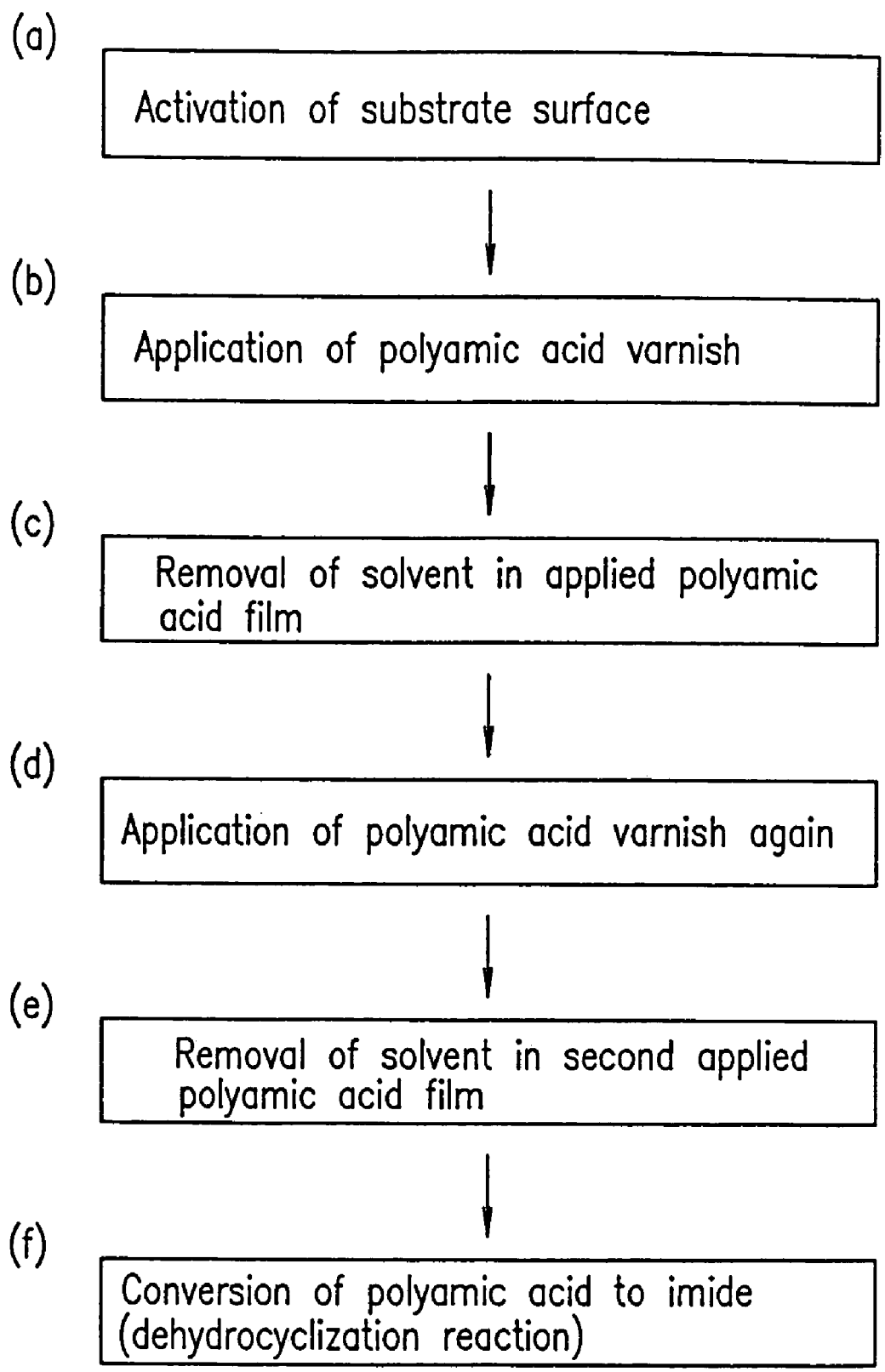
FIGS. 16(a) through 16(f) constitute a chart showing an exemplary method for producing a thick polyimide film.

FIG. 16 is a process flow chart of the production method in Japanese Patent No. 2607669. Hereinafter, the method will be described with reference to FIG. 16.

Firstly, a metal substrate is immersed in dilute sulfuric acid heated at 40 to 60° C. for one to two minutes to remove oxide, so that a surface thereof is activated, or alternatively, a metal thin film layer having an active surface is formed on a ceramic substrate (FIG. 16(*a*)). Polyamic acid varnish obtained by dissolving polyamic acid, which is a precursor for a polyimide resin, in an organic solvent is applied to the resultant substrate (FIG. 16(*b*)). In this case, the thickness of the applied polyamic acid varnish is selected so that the thickness will be smaller than or equal to 15 μm (preferably 10 μm or less) when the applied polyamic acid varnish is converted into polyimide.

Thereafter, the support member on which the polyamic acid varnish-applied film has been formed is placed in a dry furnace, for example. The solvent is removed from the support member by heating the support member at a temperature of about 50 to about 1000° C. at which polyamic acid varnish is not converted to imide, for example (FIG. 16(*c*)). If the removal of the solvent is insufficient, it is difficult to apply further smooth layers (a second layer and more layers thereafter) of polyamic acid varnish, or foams are generated when polyamic acid varnish is converted to imide. Such foams cause voids within the polyimide resin.

After the removal of the solvent, the polyamic acid varnish used in the above-described step shown in FIG. 16(*b*) is applied again on the above-described applied film (FIG. 16(*d*)). Under the same conditions as those of the above-described step shown in FIG. 16(*c*), solvent in the second applied film layer of polyamic acid is removed by heating (FIG. 16(*e*)). If the film thickness is insufficient, the steps of applying polyamic acid varnish and removing solvent are repeated, thereby making it possible to obtain a desired film thickness.

Finally, after the removal of the solvent, the second applied film layer of polyamic acid is subjected to heat treatment at a temperature of, for example, about 120 to about 480° C. at which polyamic acid is converted to imide. Polyamic acid is converted to imide by a dehydrocyclization reaction, thereby forming polyimide (FIG. 16(*f*)). This conversion to imide is preferably conducted in an inert atmosphere, such as a nitrogen atmosphere.

By the above-described steps, polyimide having excellent surface smoothness, which includes little internal flaws due to foams, can be formed on a substrate. Moreover, it is possible to form a thick polyimide film having a desired thickness by applying multiple layers of polyamic acid varnish.

In this method however, concerning optical applications, the film becomes cloudy even without there being foams within the film, which may cause a reduction in light transmittance. Further, in the resultant thick polyimide film, refractive index distribution is discontinuous at a portion corresponding to an interface (optical interface) between each layer of polyamic acid. Therefore, if light enters an optical component which is made of such a thick polyimide film, a phenomenon that outgoing light is split may occur. Furthermore, due to the heat treatment of polyamic acid, a tensile stress of about several tens of MPa occurs in the thick polyimide film. Therefore, a resultant substrate with a thick polyimide film is likely to be warped so that a convex surface is present on the substrate side.

Next, a method for producing a thick polyimide film, which solves the above-described problems, will be described.

FIGS. 17(a) to 17(d) are diagrams for explaining the steps of the production method. Referring to FIG. 17(a), a surface treatment agent is applied to a substrate 71 and dried in advance so as to improve the adhesiveness of the substrate 71. The surface treatment agent varies depending on polyimide used. Specifically, OPI coupler (manufactured by Hitachi Chemical Co., Ltd.) may be spin-coated at 4000 rpm, followed by baking at 200° C. for 20 minutes, for example.

Next, as shown in FIG. 17(b), polyamic acid varnish 72 consisting of polyamic acid, which is a precursor of polyimide, and a solvent is applied onto the substrate 71. Specifically, fluorinated polyimide varnish OPI-N2005 (manufactured by Hitachi Chemical Co., Ltd.) is flowed and extended for application, for example. The application may be performed by spin coating, casting, or the like. The thickness of the applied polyamic acid varnish 72 can be controlled by the viscosity thereof in the case of the flow and extension method and the spin coating, and by the amount thereof in the case of the casting, and is determined so that the final thick polyimide film 74 will be a predetermined thickness of a (see FIG. 17(d)). The solvent remains immediately after the application of the polyamic acid varnish 72. The thickness of the applied polyamic acid varnish 72 is actually confirmed after a step shown in FIG. 17(c) following the casting step. Specifically, for example, when the polyamic acid varnish 72 having a viscosity of about 20 Pa·s and a resin concentration of 25% is applied at a thickness of about 1.5 mm, the thickness after the step shown in FIG. 17(c) is about 350 μm.

Figure 19:
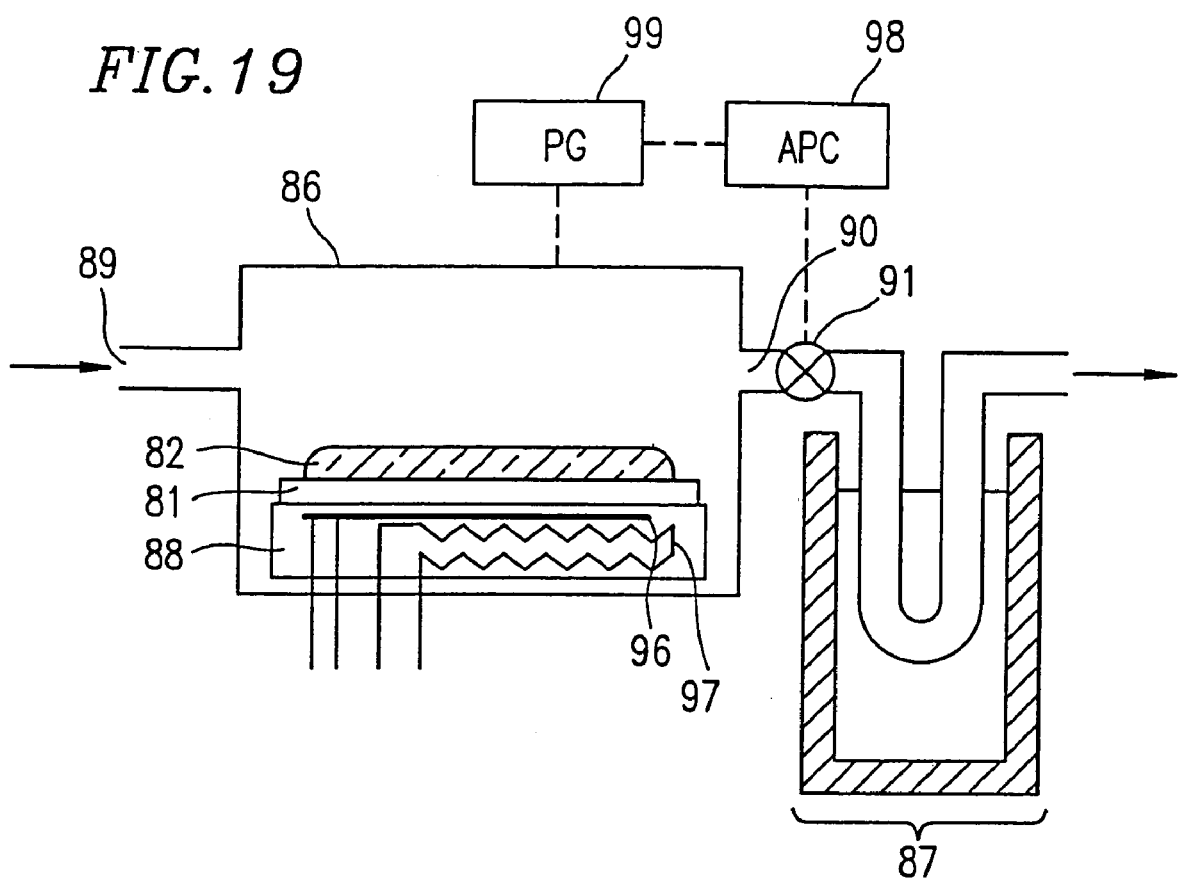
FIG. 19 is a diagram showing another exemplary drying apparatus used to produce a thick polyimide film.

After the casting of the polyamic acid varnish 72, the solvent contained in the polyamic acid varnish 72 is dried, so that a thick polyamic acid film 73 is formed (see FIG. 17(c)). The solvent may be dried as described below using a drying apparatus as shown in FIG. 18 or 19. Since the above-described polyamic acid varnish 72 contains N,N-dimethylacetamide (the boiling point is 166° C. at one atmosphere, or 83° C. at 32 mmHg) as a solvent, heating at a pressure of −50 mmHg or more at 60° C. or less is sufficient for drying the solvent. Actually, heating is conducted at a pressure of 350 mmHg and at 50° C. for 5 hours. The time to finish the solvent drying step is determined by the hardness of the thick film, the absence of a reduction in film thickness, or the like. Preferably, the conditions for drying are determined by finally confirming that the film will not become cloudy in a subsequent step of conversion to imide by heating.

Finally, the substrate 71, on which the thick polyamic acid film 73 has been formed, is heated, so that the thick polyamic acid 73 is converted into imide to form a thick polyimide film 74 (see FIG. 17(d)). Specifically, the above-described thick polyamic acid film 73 is heated in air at a temperature which is raised in a stepwise manner, and finally, heating is conducted at 350° C. at 20 minutes, such that the thick polyimide film 74 which does not contain any foam and is not cloudy is obtained. The resultant thick polyimide film is about 200 μm in thickness.

The light transmittance (excluding surface reflection) of the thick polyimide film 74 is 61% for light having a wavelength of 650 nm, and 87% for light having a wavelength of 780 nm, which are sufficient levels for optical use (the low transmittance for the short wavelength is due to light absorption caused by transition of π electrons, not scattering loss caused by foams or cloudiness).

Next, a drying apparatus used in the above-described step of FIG. 17(c) will be described with reference to FIGS. 18 and 19.

A drying apparatus 100 of FIG. 18 comprises a airtight container 86, a trap 87, a hot plate 88, and an exhaust pump (not shown). The airtight container 86 is provided with a gas introduction portion 89 and a gas exhaust portion 90. The gas introduction portion 89 is provided with a flow rate adjusting valve 91. The gas exhaust portion 90 is provided with an exhaust rate adjusting valve 92. In the trap 87, a cooling pipe 93 is immersed in a cooling medium 95 contained in a heat insulation container 94, so that the solvent in the vapor state within an exhaust gas is trapped as liquid or solid. As the cooling medium 95, liquid nitrogen, sherbet-like ethanol, or the like can be used. A temperature sensing probe 96 and a heater 97 are incorporated with the hot plate 88, so that the top surface of the hot plate 88 can be held at an arbitrary temperature (note that the substrate 71 is to be placed on the hot plate 88). The flow rate adjusting valve 91 is controlled by an automatic pressure controller (APC) 98 electrically connected to a pressure gauge (PG) 99 provided in the airtight container 86, so that the airtight container 86 can be held at an arbitrary pressure. The exhaust rate adjusting valve 92 is used to adjust the exhaust rate of the airtight container 86. Gases, such as air, argon, nitrogen, and the like, are introduced through the gas introduction portion 89, while being drained through the gas exhaust portion 90, so that the inside of the airtight container 86 can be held in a reduced pressure state. These gases may be used alone or in combination.

Importantly, the airtight container 86 is in a reduced pressure state but not sealed, and is supplied with gases, such as air, argon, nitrogen, and the like, while the generated solvent vapor is constantly drained. For this reason, drying by evaporation can be continued while the solvent contained in the polyamic acid varnish 72 is prevented from being boiled. If the solvent is boiled, foams occur within the polyamic acid varnish 72, and the surface evenness of the resultant thick polyamic acid film 73 is not obtained.

When the solvent is evaporated, the temperature is lowered, so that the evaporation rate is reduced. The upper limit of the amount of the evaporated solvent is determined by a saturation vapor pressure depending on the temperature. Therefore, the substrate is preferably heated in a temperature range within which the solvent is not boiled. In this case, the heating temperature must not exceed a temperature from which conversion of polyamic acid to imide begins. When heating is conducted at a temperature greater than or equal to the temperature at which the conversion to imide occurs, a film is generated on a surface of the polyamic acid varnish 72, so that the solvent is prevented from being evaporated. If the removal of the solvent is insufficient, when the thick polyamic acid film 73 is converted to imide by heating, the thick polyamic acid film 73 becomes cloudy in a process of increasing the temperature to about 100 to about 150° C. Such a resultant thick polyamic acid film 74 cannot be used in optical applications. Further, the cloudy thick polyimide film 74 is very brittle. If such a thick polyimide film 74 is further heated, a crack occurs due to stress caused by shrinkage of the film.

The above-described polyamic acid varnish 72 contains N,N-dimethylacetamide as a solvent. The boiling point of N,N-dimethylacetamide is 166° C. at one atmosphere and 83° C. at 32 mmHg. Actually, heating is conducted at a pressure of 350 mmHg and at 50° C. for 5 hours. Under such conditions, a film is not formed on the surface of the thick polyamic acid film, and the thick polyamic acid film does not become cloudy in the conversion to imide by heating.

Reducing pressure as described above is not necessarily required to accelerate the evaporation of the solvent contained in the polyamic acid varnish 72. Rather, the pressure is preferably greater than or equal to one atmosphere in order to prevent boiling. This method is suitable for a solvent represented by ethers whose boiling point is low.

FIG. 19 is a diagram showing a configuration of a drying apparatus 110 when the solvent is dried under pressure. The parts having the same functions as those of FIG. 18 have the same reference numerals. The drying apparatus 110 comprises a airtight container 86, a trap 87, and a hot plate 88. The airtight container 86 is provided with a gas introduction portion 89 and a gas exhaust portion 90. The gas exhaust portion 90 is provided with a flow rate adjusting valve 91. The trap 87 has a function of trapping solvent vapor in a drained gas as liquid or solid in a manner similar to that of the apparatus of FIG. 18. A temperature sensing probe 96 and a heater 97 are incorporated with the hot plate 88, so that the top surface of the hot plate 88 can be held at an arbitrary temperature. The flow rate adjusting valve 91 is controlled by an automatic pressure controller (APC) 98 electrically connected to a pressure gauge (PG) 99 provided in the airtight container 86, so that the airtight container 86 can be held at an arbitrary pressure. Pressurized gases, such as air, argon, nitrogen, and the like, are introduced through the gas introduction portion 89, while being spontaneously drained through the gas exhaust portion 90, so that the inside of the airtight container 86 can be held in a pressurized state (one atmosphere or more) while the gases are being flowed. These gases may be used alone or in combination. Therefore, even when the substrate is heated by the hot plate 88 up to a temperature greater than or equal to the boiling point under one atmosphere, the solvent contained in the polyamic acid varnish is not boiled, so that the surface evenness of the resultant thick polyamic acid film can be maintained. Note that, as described above, the heating temperature must not exceed a temperature from which conversion of polyamic acid to imide begins.

Another exemplary method for producing a thick polyimide film will be described with reference to FIGS. 20(a) through 20(f). In the steps shown in FIG. 17, the thick polyimide film 74 is directly formed on the substrate 71, such that the substrate 71 with the thick polyimide film 74 may be warped due to stress. To prevent this, the thick polyamic acid film 73 is temporarily peeled off and subjected to conversion to imide by heating. The resultant thick polyimide film is then adhered to the substrate 71.

Figure 20:
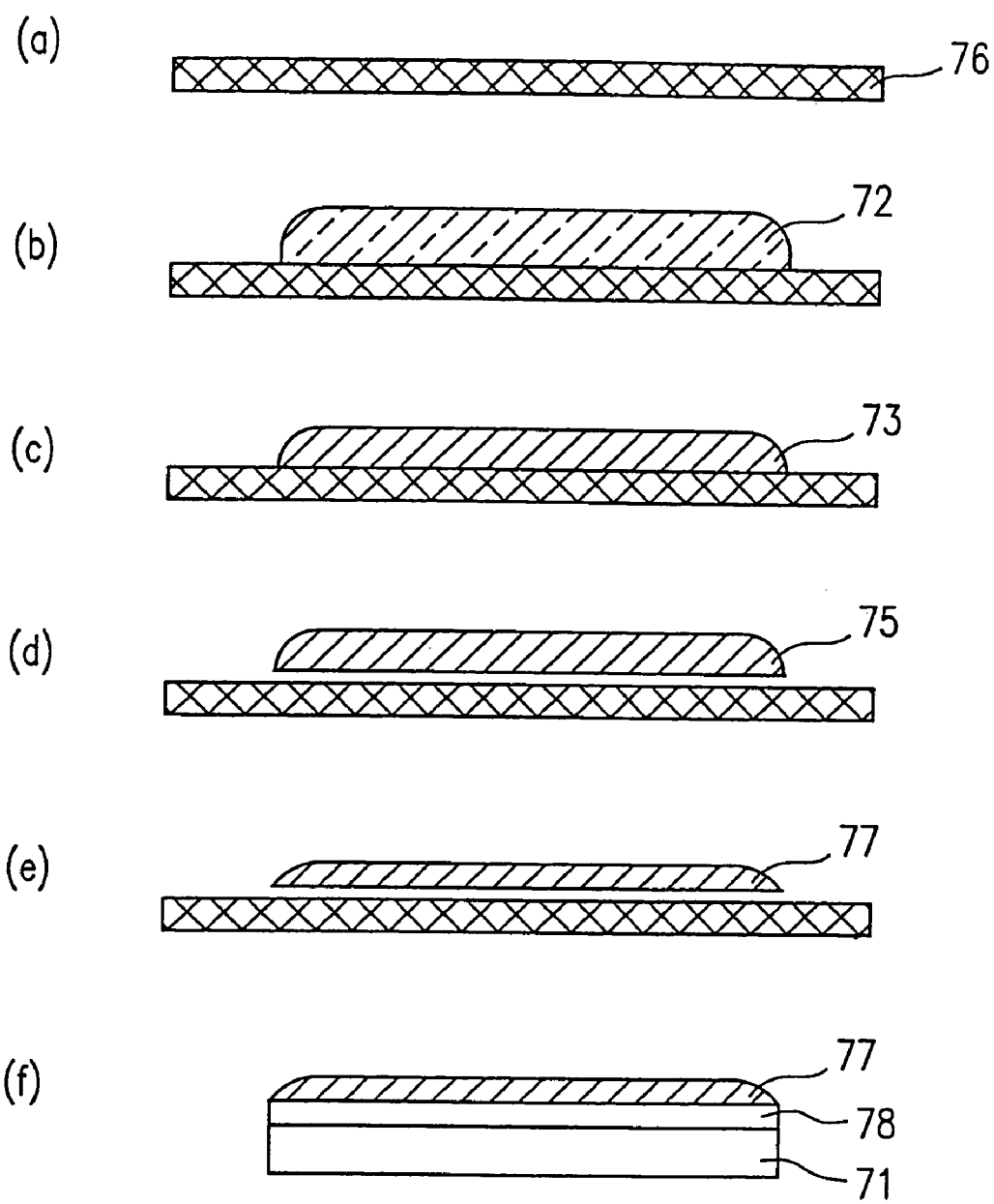
FIGS. 20(a) through 20(f) are diagrams showing still another method for producing a thick polyimide film.

A support substrate 76 shown in FIG. 20(a) is not subjected to surface treatment, particularly surface treatment to improve the adhesiveness of the film, by taking into consideration a subsequent peeling step. Rather, in order to facilitate peeling off, the support substrate 76 may be treated with a fluorine- or silicone-based mold release agent as necessary.

Next, as shown in FIG. 20(b), polyamic acid varnish 72 is applied onto the support substrate 76. The application method may be spin coating, casting, or the like, similar to FIG. 17.

Next, as shown in FIG. 20(c), a solvent contained in the polyamic acid varnish 72 is dried to produce a thick polyamic acid film 73. The solvent may be dried using the drying apparatus 100 or 110 shown in FIG. 18 or 19, respectively.

Next, as shown in FIG. 20(d), the thick polyamic acid film 73 is peeled off the support substrate 76 to produce a thick polyamic acid film 75.

Thereafter, as shown in FIG. 20(E), the thick polyamic acid film 75 is heated to be converted to imide to produce a thick polyimide film 77.

Finally, as shown in FIG. 20(f), the thick polyimide film 22 is adhered to the substrate 71 using an adhesive 78 to produce a substrate with a thick polyimide film. Needless to say, the adhesive used is preferably one that does not affect the thick polyimide film 77 or the substrate 71 and that has a high level of adhesive strength. In addition, an adhesive having excellent heat resistance and chemical resistance is preferably used to exploit the excellent properties of polyimide. In an optical component prepared by processing a thick polyimide optical film, transmitted light is transmitted only within the thick polyimide film 77, and is not particularly constrained by the optical property of the adhesive. Therefore, the adhesive may be colored. Specifically, the thick polyimide film 77 is adhered to the substrate 71 using a heat resistant adhesive sheet 1580 (manufactured by Sumitomo 3M Ltd.) or heat-activated adhesive film 1650 (manufactured by Three Bond Co., Ltd.) where compression-bonding is carried out at 150° C. for several hours, for example.

According to this method, since the thick polyimide film 77, for which the conversion to imide has been completed, is attached to the substrate 71, it is possible to prevent a large warp from being generated in the substrate having the thick polyimide film thereon.

INDUSTRIAL APPLICABILITY

The optical component of the present invention is considerably small and light, as compared to bulk type optical components. Further, a large number of optical components can be simultaneously produced, resulting in an improvement in productivity. Furthermore, integration is possible. Therefore, a step of assembling a plurality of optical elements can be omitted.

Further, the optical component of the present invention can be designed in accordance with geometrical optics, similar to bulk type optical components, and has advantages over waveguide type optical components which have to be handled in accordance with wave optics.

Furthermore, a thick optical film whose thickness is ten times or more greater than that of waveguide type optical components is used, so that alignment is easy. Whereas a waveguide type optical component requires a core layer and a cladding layer, an optical component of the present invention does not require a cladding layer and a step of producing such a film can be omitted. Moreover, in waveguide type optical components, light propagates while light is repeatedly reflected by a surface thereof parallel to the substrate surface. Therefore, propagation loss is great. To suppress the loss, strict control of film thickness and the surface state of a film is required. In the optical component of the present invention, a loss factor can be mainly limited to light absorption by a material.

Still furthermore, according to the method for producing a thick polyimide film of the present invention, it is possible to prevent a solvent from being boiled during the drying step. Therefore, a thick polyimide film which is not cloudy and whose surface is even can be produced.

The invention claimed is:

1. An optical component comprising:

a substrate; and at least one optical element obtained by processing an optical film, said film having a thickness between about 50 µm and 300 µm and being provided on the substrate, wherein the optical component has a plurality of surfaces substantially not parallel to a surface of the substrate, wherein the optical film consists of an optical anisotropic material having an optical axis normal to the surface of the substrate, and the optical element is a polarization splitting prism for splitting incident light into two orthogonal polarized light beams, and wherein light is reflected, refracted, diffracted, or transmitted by a surface of the optical element substantially perpendicular to the surface of the substrate, so that light propagating in a direction substantially parallel to the surface of the substrate is generated or an optical path of light propagating in a direction substantially parallel to the surface of the substrate is controlled, wherein the at least one optical element is a plurality of optical elements and at least one of the plurality of optical elements is said polarization splitting prism for splitting incident light into two orthogonal polarized light beams, and at least another one of the plurality of optical elements is a mirror for converting a propagation direction of light from a direction substantially normal to the surface of the substrate to a direction substantially parallel to the surface of the substrate, or vice versa.

2. An optical component according to claim 1, wherein the polarization splitting prism and the mirror are integrated with the optical component.

3. An optical component, comprising:

a substrate; and at least one optical element obtained by processing an optical film, said film having a thickness between about 50 µm and 300 µm and being provided on the substrate, wherein the optical component has a plurality of surfaces substantially not parallel to a surface of the substrate, wherein the optical film consists of an optical anisotropic material having an optical axis normal to the surface of the substrate, and the optical element is a polarization splitting prism for splitting incident light into two orthogonal polarized light beams, wherein the at least one optical element is a plurality of optical elements and at least one of the plurality of optical elements is said polarization splitting prism for splitting incident light into two orthogonal polarized light beams, and at least another one of the plurality of optical elements is a mirror for converting a propagation direction of light from a direction substantially normal to the surface of the substrate to a direction substantially parallel to the surface of the substrate, or vice versa.

4. An optical component according to claim 3, wherein said polarization splitting prism and the mirror are integrated with said optical component.

* * * * *